United States Patent
Lam et al.

(10) Patent No.: US 8,779,674 B2
(45) Date of Patent: Jul. 15, 2014

(54) ELECTRONIC BALLAST WITH HIGH POWER FACTOR

(76) Inventors: John Lam, Kingston (CA); Praveen Jain, Kingston (CA)

(*) Notice: Subject to any disclaimer, the term of this patent is extended or adjusted under 35 U.S.C. 154(b) by 80 days.

(21) Appl. No.: 13/391,491

(22) PCT Filed: Aug. 20, 2010

(86) PCT No.: PCT/CA2010/001294
§ 371 (c)(1),
(2), (4) Date: Feb. 21, 2012

(87) PCT Pub. No.: WO2011/020199
PCT Pub. Date: Feb. 24, 2011

(65) Prior Publication Data
US 2012/0146526 A1 Jun. 14, 2012

Related U.S. Application Data

(60) Provisional application No. 61/236,036, filed on Aug. 21, 2009.

(51) Int. Cl.
H05B 37/00 (2006.01)
H05B 39/00 (2006.01)
H05B 41/14 (2006.01)

(52) U.S. Cl.
USPC ............... 315/200 R; 315/209 R; 315/223; 315/225; 315/DIG. 5

(58) Field of Classification Search
None
See application file for complete search history.

(56) References Cited

U.S. PATENT DOCUMENTS

| | | | | |
|---|---|---|---|---|
| 5,694,006 A | * | 12/1997 | Konopka | 315/219 |
| 6,784,622 B2 | * | 8/2004 | Newman et al. | 315/219 |
| 2003/0222595 A1 | | 12/2003 | Chen et al. | |
| 2007/0040516 A1 | * | 2/2007 | Chen | 315/291 |

FOREIGN PATENT DOCUMENTS

| | | |
|---|---|---|
| EP | 1521508 A1 | 6/2005 |
| WO | 2006/120641 A2 | 11/2006 |
| WO | 2008/023341 A2 | 2/2008 |

OTHER PUBLICATIONS

National Resources Canada, "Commercial and Institutional Retrofits—Technical Information—Fluorescent Lamp and Ballast Options", 2002, cited at Energy Star, "Learn about Light Input", http://www.energystargov/index.cfm?c=cfls.pr_cfls_lumens.
Agilent Technologies, Compliance Testing to the IEC 1000-3-2 (EN 61000-3-2) and IEC 1000-3-3 (EN 6100-3-3) Standards, 1st ed., Mar. 1995.

(Continued)

*Primary Examiner* — Anh Tran
(74) *Attorney, Agent, or Firm* — Brion Raffoul

(57) ABSTRACT

This invention provides an integrated power supply for a controller of an electronic ballast for a fluorescent lamp. The integrated power supply couples output power from the electronic ballast and uses the coupled power to provide power to the controller. In one embodiment, the electronic ballast may include a rectifier for converting an alternating current input voltage into a direct current output voltage, and a circuit including a combined power factor correction (PFC) stage and an inverter, wherein the PFC stage and the inverter share a switch. Also provided is a controller for an electronic ballast. The controller may include a voltage mode or current mode duty ratio controller that controls a duty ratio of a switch of the ballast. The controller and the ballast allow dimming of the fluorescent lamp while maintaining a high power factor.

14 Claims, 35 Drawing Sheets

(56) References Cited

OTHER PUBLICATIONS

Tsai-Fu Wu et al, "Unified Approach to Developing Single Stage Power Converters", IEEE Trans. on Aerospace and Electronic Systems, vol. 34, No. 1, 1998, pp. 211-223, Jan. 1998.

A.J. Calleja et al, "Electronic Ballast Based on Single-Stage High-Power-Factor Topologies: A comparative study", 2002 IEEE Industrial Electronics Society Conference, vol. 2, pp. 1196-1201, Nov. 5-8, 2002.

J.M. Alonso et al, "Analysis and Design of a Novel Single-Stage High-Power-Factor Electronic Ballast Based on Integrated Buck Half-Bridge Resonant Inverter", IEEE Trans. on Power Electronics, vol. 19, No. 2, Mar. 2004, pp. 550-559.

H.-J. Chiu et al, "Single-Stage Dimmable Electronic Ballast With High Power Factor and Low EMi", 2005 Electronic and Power Applications Conference, vol. 152, No. 1, pp. 89-95, Jan. 2005.

A.S. de Morais et al, "A High Power Factor Ballast Using a Single Switch With Both Power Stages Integrated", IEEE Trans. on Power Electronics, vol. 21, No. 2, Mar. 2006, pp. 524-531.

Weihong Qiu et al, "Single-Switch Zero-Voltage-Switching High Power Factor Electronic Ballast", IEEE 2002 Power Electronics Specialists Conference, pp. 773-778.

M. Ponce et al "High Power Factor Electronic Ballast for Compact Fluorescent Lamps Based in a Class E Amplifier With LCC Resonant Tank", 1999 IEEE Applied Power Electronics Conference, pp. 486-492.

H.L. Cheng et al, "Single-Switch High-Power-Factor Electronic Ballast for Compact Fluorescent Lamps", 2001 IEEE International Conference on Power Electronics and Drive Systems, pp. 764-769.

K.-H. Liu et al, "Current Waveform Distortion in Power Factor Correction Circuits Employing Discontinuous-Mode Boost Converters", 1989 IEEE Power Electronics Specialists Conference, pp. 825-829.

D.S.L. Simonetti et al, "The Discontinuous Conduction Mode Sepic and Cuk Power Factor Preregulators: Analysis and Design", IEEE Transactions on Industrial Electronics, vol. 44, No. 5, Oct. 1997, pp. 630-637.

J. Lam et al, "A Low Cost Single-Stage Electronic Ballast With Unity Power factor Using a Novel Single Switch Current Fed Resonant Inverter Topology", 2007 IEEE Power Electronic Specialists Conference, Jun. 17-21, 2007, pp. 3106-3111.

International Searching Authority, International Preliminary Report on Patentability for PCT/CA2010/001294.

International Searching Authority, Written Opinion of the International Searching Authority for PCT/CA2010/001294.

International Searching Authority, International Search Report for PCT/CA2010/001294.

* cited by examiner

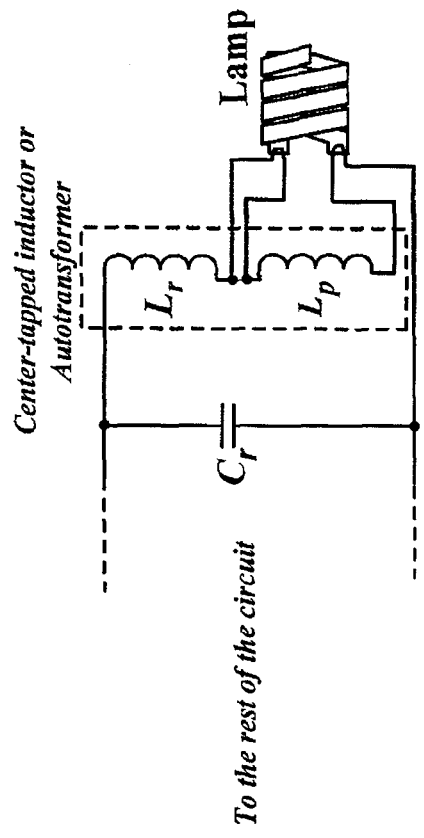
Figure 2D
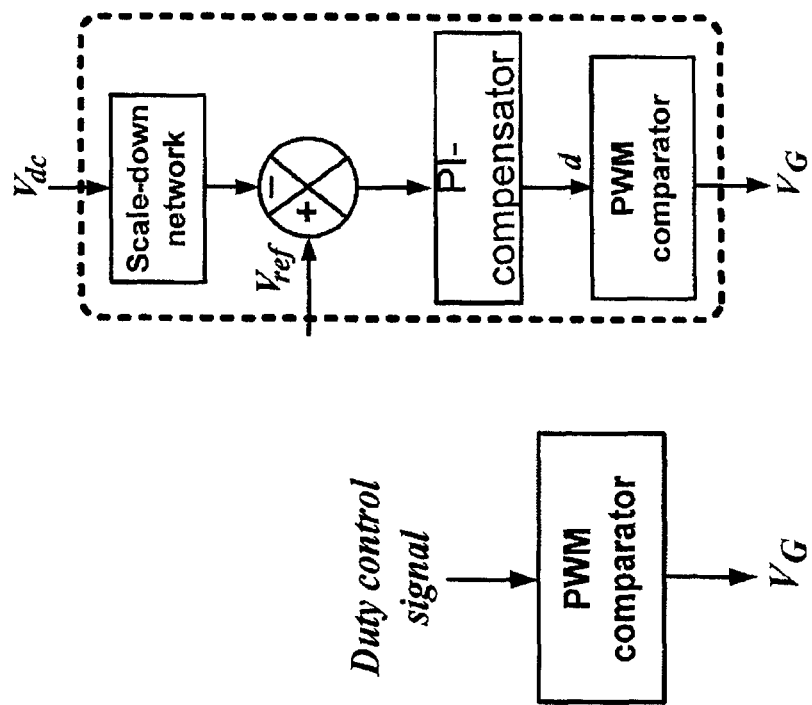
Figure 2C
Figure 2B

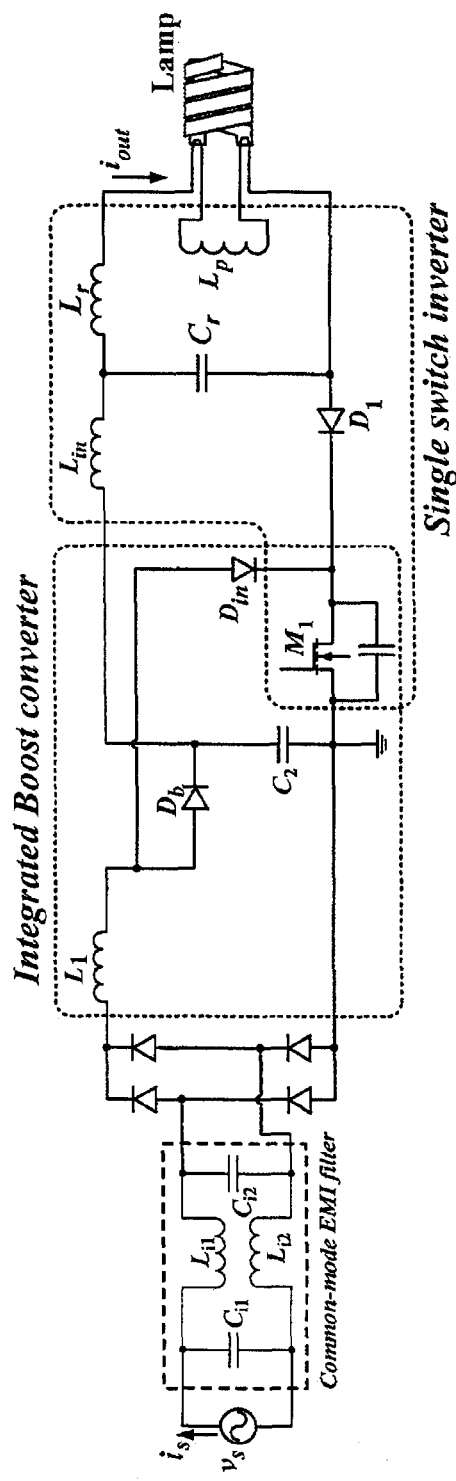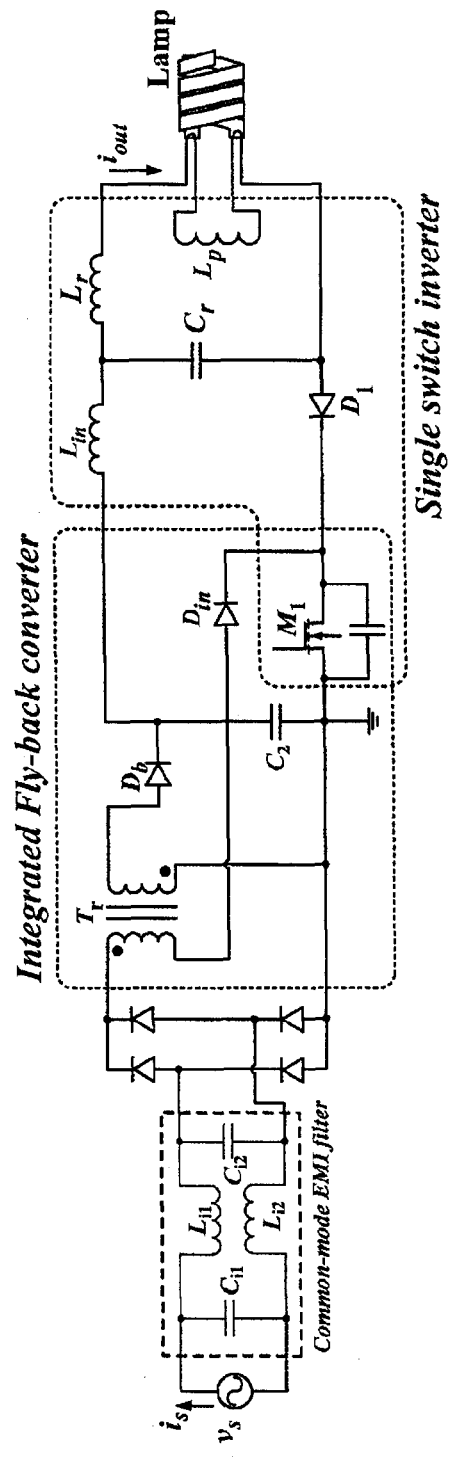
Figure 2E
Figure 2F

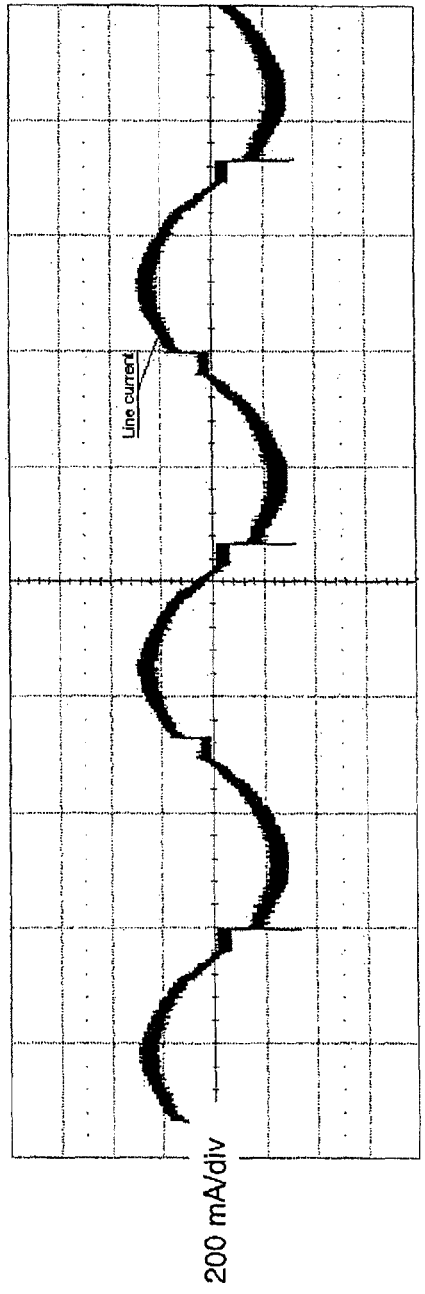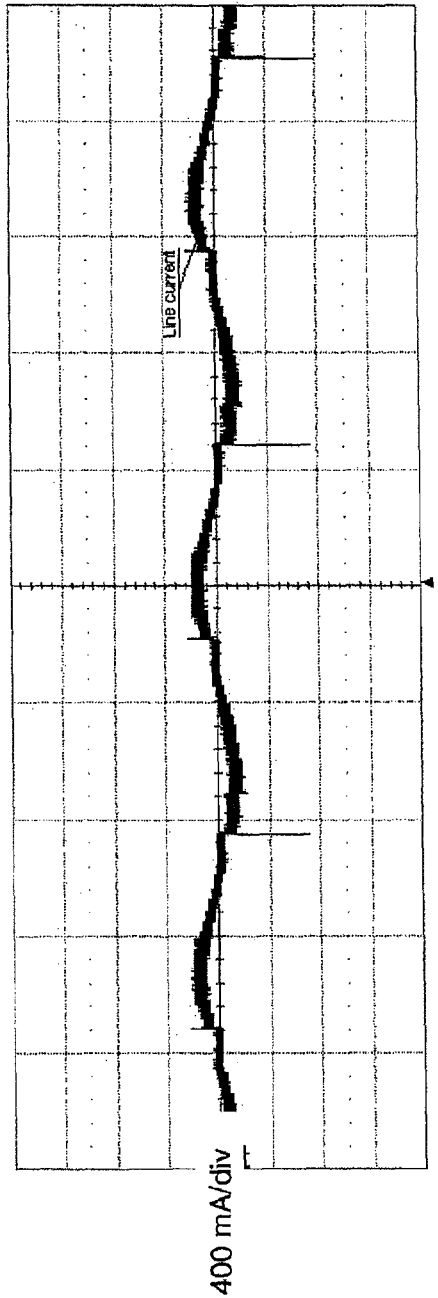

ELECTRONIC BALLAST WITH HIGH POWER FACTOR

FIELD OF THE INVENTION

This invention relates to an electronic ballast for a fluorescent lamp, to a dimmer controller for a an electronic ballast, and to an integrated power supply for a controller for an electronic ballast. In particular, this invention relates to an electronic ballast, a dimmer controller, and an integrated power supply for the controller, with high power factor and compact size, suitable for a compact fluorescent lamp.

BACKGROUND OF THE INVENTION

Fluorescent lighting is widely used in residential and commercial applications. Because a fluorescent lamp consumes only one-third of the power that is dissipated in an incandescent lamp of equivalent light output, and its lifetime is 1000 times that of an incandescent lamp [1], it conserves energy and reduces the energy cost of lighting.

The development of compact fluorescent lamps (CFLs) has increased the use of fluorescent lighting in residential applications. The key component of a CFL is the high frequency electronic ballast that provides proper lamp ignition and lamp current stabilization. It is known that high frequency electronic ballasts operating at >25 kHz provide more desirable performance than magnetic ballasts in fluorescent lamps, as they: (1) reduce the ballast volume; (2) increase efficiency by at least 20%; (3) eliminate light flickering; (4) implement advanced dimming control with great flexibility. However, like other electronic appliances, the harmonics of the line current from the fluorescent lamp must comply with the IEC1000-3-2 standard [2] when the lamp power exceeds 25 W.

In a conventional electronic ballast as shown in FIG. 1A, a diode rectifier connected across a DC-link capacitor with a resonant inverter produces a poor power factor (e.g., less than 0.6), and the harmonics content of the line current exceed the limits of the standard. A simple way to correct the power factor problem is to insert a power factor correction (PFC) circuit between the rectifier and the inverter as shown in FIG. 1B so that the shape of the line current follows the sinusoidal line voltage and a high power factor can be achieved at the input. However, this kind of circuit configuration usually results in a high cost. Moreover, the large size of the circuit is incompatible with the size of a CFL.

Currently-available technology cannot achieve low cost, small size, high power factor, and dimmability in fluorescent lamps. In particular, dimming and power factor have generally been sacrificed in consumer grade lamps in favour of low cost and small size.

SUMMARY OF THE INVENTION

One aspect relates to an electronic ballast circuit for a fluorescent lamp, comprising: a rectifier for converting an alternating current input voltage into a direct current output voltage; and a circuit including a combined power factor correction (PFC) stage and a resonant inverter; wherein the PFC stage and the resonant inverter share a single switch.

In one embodiment the PFC stage may include a single ended primary inductor converter (SEPIC). The electronic ballast circuit may further comprise an EMI filter.

Another aspect relates to a dimmer controller. The dimmer controller may be for use with a standard leading edge dimmer or trailing edge dimmer, or a resistive dimmer. The dimmer controller may be for use with a triac dimmer, a thyristor dimmer, or a transistor dimmer. The dimmer controller may include a duty ratio controller. The fluorescent lamp may be a compact fluorescent lamp (CFL).

The electronic ballast circuit may further comprise a dimmer controller.

Another embodiment relates to an electronic ballast circuit for a fluorescent lamp, comprising: a rectifier for converting an alternating current input voltage into a direct current output voltage; and a circuit including a combined single ended primary inductor converter (SEPIC) power factor correction (PFC) stage and a resonant inverter; wherein the PFC stage and the resonant inverter share a single switch.

Another aspect relates to a method for operating a fluorescent lamp, comprising: converting an alternating current input voltage into a direct current output voltage; connecting the direct current output voltage to a circuit including a combined power factor correction (PFC) stage and a resonant inverter; and connecting an output of the circuit to the fluorescent lamp; wherein the PFC stage and the resonant inverter share a single switch.

In one embodiment, the PFC stage may include a single ended primary inductor converter (SEPIC).

The method may further comprise filtering the alternating current input voltage with an EMI filter. The method may further comprise dimming the fluorescent lamp. Dimming may comprise connecting a dimmer controller to the circuit for use with a standard leading edge dimmer or trailing edge dimmer. The fluorescent lamp may be a compact fluorescent lamp (CFL).

Another embodiment relates to a method for operating a fluorescent lamp, comprising: converting an alternating current input voltage into a direct current output voltage; connecting the direct current output voltage to a circuit including a combined single ended primary inductor converter (SEPIC) power factor correction (PFC) stage and a resonant inverter; and connecting an output of the circuit to the fluorescent lamp; wherein the PFC stage and the resonant inverter share a single switch.

Another aspect of the invention relates to a single-stage, single-switch electronic ballast topology using a single ended primary inductor converter (SEPIC) power factor corrector that is integrated with a single switch current fed inverter. An electronic ballast circuit as described herein is compact and minimizes components in the ballast power circuit. In one embodiment the switch is not connected in parallel with the resonant circuit, so the resonant current does not flow through the switch, resulting in lower current stress across the switch and lower switch conduction loss.

Another aspect relates to an electronic ballast circuit for a fluorescent lamp, comprising: a rectifier for converting an alternating current input voltage into a direct current output voltage; and a circuit including a combined power factor correction (PFC) stage and an inverter; wherein the PFC stage and the inverter share a switch.

The PFC stage may include a single ended primary inductor converter (SEPIC). The inverter may be a resonant inverter. The inverter may be a current fed inverter. The current fed inverter may include a C-L-L resonant circuit. In some embodiments, the shared switch may be the only switch. The electronic ballast circuit may include means for operating the shared switch at a selected duty ratio. The duty ratio may be variable. The duty ratio may be variable in accordance with a line voltage applied to the electronic ballast circuit. The electronic ballast circuit may further comprise an EMI filter. The fluorescent lamp may be a compact fluorescent lamp (CFL).

Another aspect relates to a dimmer controller for an electronic ballast for a fluorescent lamp, comprising: a duty ratio controller that controls a duty ratio of a switch; and means for adjusting the duty ratio according to a nonlinear function, so that an arc is sustained across the lamp during dimming. Application of a high duty ratio signal results in an arc being sustained across the lamp during dimming or brownout. The means for adjusting the duty ratio may include a multiplier. The dimmer controller may be for use with a standard dimmer. The standard dimmer may be a triac dimmer. The dimmer controller may include a single output for driving a single switch of an electronic ballast circuit. The dimmer controller may include two or more outputs for driving two or more switches of an electronic ballast circuit. The fluorescent lamp is a CFL.

Another aspect relates to a combination including an electronic ballast circuit and a dimmer controller for a fluorescent lamp, comprising: a rectifier for converting an alternating current input voltage into a direct current output voltage; a circuit including a combined power factor correction (PFC) stage and an inverter, wherein the PFC stage and the inverter share a switch; a duty ratio controller that controls a duty ratio of the switch; and means for adjusting the duty ratio according to a nonlinear function, so that an arc is sustained across the lamp during dimming.

The PFC stage may include a SEPIC. The inverter may be a resonant inverter. The inverter may be a current fed inverter. The current fed inverter may include a C-L-L resonant circuit. The shared switch may be the only switch. The combination may further comprise an EMI filter. The dimmer controller may be for use with a standard dimmer. The standard dimmer may be a triac dimmer. The fluorescent lamp may be a CFL.

Another aspect relates to a controller for an electronic ballast for a fluorescent lamp, comprising: a duty ratio controller that controls a duty ratio of a switch; and means for adjusting the duty ratio according to a nonlinear function, so that an arc is sustained across the lamp. Application of a high duty ratio signal results in an arc being sustained across the lamp during low line voltage or brownout.

Another aspect relates to a combination of a controller and an electronic ballast for a fluorescent lamp, comprising: a rectifier for converting an alternating current input voltage into a direct current output voltage; a circuit including a combined power factor correction (PFC) stage and an inverter, wherein the PFC stage and the inverter share a switch; a duty ratio controller that controls a duty ratio of the switch; and means for adjusting the duty ratio according to a nonlinear function, so that an arc is sustained across the lamp. The PFC stage may include a SEPIC. The inverter may be a resonant inverter. The inverter may be a current fed inverter. The current fed inverter may include a C-L-L resonant circuit. The shared switch may be the only switch. The combination may further comprise an EMI filter. The dimmer controller may be for use with a standard dimmer. The standard dimmer may be a triac dimmer or a transistor dimmer. The fluorescent lamp may be a CFL.

Another aspect relates to a method for operating a fluorescent lamp, comprising: converting an alternating current input voltage into a direct current output voltage; connecting the direct current output voltage to a circuit including a combined power factor correction (PFC) stage and an inverter; and connecting an output of the circuit to the fluorescent lamp; wherein the PFC stage and the inverter share a switch.

The method may include using a SEPIC for the PFC stage. The method may include using a resonant inverter for the inverter. The method may include using a current fed inverter for the inverter. The current fed inverter may include a C-L-L resonant circuit. The shared switch may be the only switch. The method may include operating the shared switch at a selected duty ratio. The method may include varying the duty ratio. The method may include varying the duty ratio in accordance with the input voltage. The method may include filtering the input voltage with an EMI filter. The fluorescent lamp may be a CFL.

Another aspect relates to a method for operating a fluorescent lamp, comprising: using a duty ratio controller to control a duty ratio of at least one switch that provides power to the lamp; and adjusting the duty ratio according to a nonlinear function, so that an arc is sustained across the lamp during dimming. Application of a high duty ratio signal results in an arc being sustained across the lamp during dimming or brownout.

Adjusting the duty ratio according to a nonlinear function may include using a multiplier. The method may comprise controlling a duty ratio of a single switch that provides power to the lamp. The method may comprise using a standard light dimmer. The standard dimmer may be a triac dimmer, a thyristor dimmer, or a transistor dimmer. The dimmer may be a resistive dimmer. The fluorescent lamp may be a CFL.

Another aspect relates to a method for operating a fluorescent lamp, comprising: operating a switch of an electronic ballast circuit including a combined power factor correction (PFC) stage and an inverter according to a duty ratio; and controlling the duty ratio of the switch so as to control lamp output power.

Controlling the duty ratio of the switch may include adjusting the duty ratio according to a nonlinear function and applying a high duty ratio signal to the duty ratio controller to sustain an arc across the lamp during dimming. Adjusting the duty ratio according to a nonlinear function may include using a multiplier. The switch may be shared between the PFC stage and the inverter. The PFC stage may be a SEPIC. The inverter may be a resonant inverter. The method may comprise using a standard light dimmer. The standard dimmer may be a triac dimmer, a thyristor dimmer, or a transistor dimmer. The dimmer may be a resistive dimmer. The fluorescent lamp may be a CFL.

Another aspect relates to a fluorescent lamp comprising an electronic ballast as described herein, a dimmer controller as described herein, or a controller as described herein, or a combination including an electronic ballast and a dimmer controller or controller as described herein. The fluorescent lamp may be a CFL.

Another aspect relates to a controller for an electronic ballast for a fluorescent lamp, comprising: a duty ratio controller that controls a duty ratio of a switch of the ballast; and means for adjusting the duty ratio according to a nonlinear function, so that an arc is sustained across the lamp during a change in supply voltage.

The means for adjusting the duty ratio may include a multiplier. The controller may include a single output for driving a single switch of the ballast circuit. The controller may include two or more outputs for driving two or more switches of the ballast circuit.

Another aspect relates to a dimmer for a fluorescent lamp, comprising: means for generating and outputting a high frequency signal; and means for changing the frequency of the high frequency signal. The output high frequency signal may be fed to a controller over the same power lines that supply AC power to the electronic ballast circuit. Alternatively, the output high frequency signal may be fed to a controller over separate conductors. The dimmer may further include means for converting the high frequency signal into a DC voltage.

Another aspect relates to a controller for an electronic ballast of a fluorescent lamp, comprising: a converter for converting the output high frequency signal of the dimmer described above to a DC voltage; a duty ratio controller that controls a duty ratio of a switch of the ballast; and means for adjusting the duty ratio according to a nonlinear function, so that an arc is sustained across the lamp during dimming of the fluorescent lamp. The means for adjusting the duty ratio includes a multiplier. The controller may include a single output for driving a single switch of the ballast circuit. The controller may include two or more outputs for driving two or more switches of the ballast circuit.

Another aspect relates to a method for operating a fluorescent lamp, comprising: varying the frequency of a high frequency signal; generating a DC voltage relative to the frequency of the high frequency signal; and using the DC voltage to adjust the duty ratio of a switch that provides power to the fluorescent lamp.

Another aspect relates to an electronic ballast circuit for a fluorescent lamp, comprising: a power circuit that outputs power to the lamp; and an integrated power supply for a controller circuit; wherein the integrated power supply includes an inductive coupling that receives at least a portion of the output power from the power circuit and delivers power to the controller circuit. The electronic ballast may include a controller circuit.

Another aspect relates to a power supply for a controller for a circuit that outputs power to a lamp, comprising: an inductive coupling that receives at least a portion of the output power from the circuit and delivers power to the controller circuit. The lamp may be a fluorescent lamp and the circuit may be an electronic ballast circuit.

Another aspect relates to an electronic ballast circuit for a fluorescent lamp, comprising: a rectifier for converting an alternating current input voltage into a direct current output voltage; a circuit including a combined power factor correction (PFC) stage and an inverter; and an integrated power supply for a controller. The electronic ballast circuit may include a controller circuit.

The integrated power supply may include a circuit for providing start-up power to the controller and a circuit for providing steady state power to the controller. The circuit for providing start-up power may include a series resistor and capacitor connected across the rectifier. The circuit for providing steady state power may include an auxiliary winding associated with an inductor of the inverter.

Another aspect relates to a controller for an electronic ballast for a fluorescent lamp, comprising: a voltage mode or current mode duty ratio controller that controls a duty ratio of a switch that provides power to the lamp. The duty ratio may be fixed or it may be controlled according to one or more parameters of the electronic ballast circuit and/or the fluorescent lamp. The controller may be used with a leading edge dimmer or a trailing edge dimmer.

Another aspect relates to a method for providing power to a controller circuit for an electronic ballast circuit for a fluorescent lamp, comprising: providing a power circuit that outputs power to the lamp; and inductive coupling at least a portion of the output power from the power circuit and delivering at least a portion of the inductively coupled power to the controller circuit.

Another aspect relates to a method for providing power to a controller for a circuit that outputs power to a lamp, comprising: inductively coupling at least a portion of the output power from the circuit and delivering at least a portion of the inductively coupled power to the controller circuit. The lamp may be a fluorescent lamp and the circuit may be an electronic ballast circuit.

Another aspect relates to a method of providing power to a fluorescent lamp, comprising: rectifying an alternating current input voltage to produce a direct current voltage; providing the direct current voltage to a circuit including a combined power factor correction (PFC) stage and an inverter to produce output power for the lamp; and inductively coupling a portion of the output power to provide power to a controller. The method may include sharing a switch between the PFC stage and the inverter. The method may include providing start-up power to the controller.

Another aspect relates to a method of dimming a fluorescent lamp, comprising: connecting a dimmer to an alternating current input voltage; rectifying the alternating current input voltage to produce a direct current voltage; providing the direct current voltage to a circuit including a combined power factor correction (PFC) stage and an inverter to produce output power for the lamp; and inductively coupling a portion of the output power to provide power to a controller.

The method may include sharing a switch between the PFC stage and the inverter. The method may include providing start-up power to the controller. The the dimmer may be a leading edge dimmer. The dimmer may be a trailing edge dimmer.

BRIEF DESCRIPTION OF THE DRAWINGS

To show more clearly how the invention may be carried into effect, embodiments of the invention will now be described, by way of example, with reference to the accompanying drawings, wherein:

FIGS. 2B and 2C are diagrams of examples of control schemes for the switch of the embodiment of FIG. 2A;

FIG. 2D shows an alternative embodiment of the circuit of FIG. 2A in which inductors $L_r$ and $L_p$ are arranged as a centre-tapped inductor or an autotransformer;

FIG. 2E shows an electronic ballast according to an alternative embodiment;

FIG. 2F shows an electronic ballast according to another alternative embodiment;

FIG. 6 shows the results of a simulation based on the embodiment of FIG. 2A, wherein

FIG. 8 shows performance waveforms of the circuit of FIG. 7 used with a 26 W CFL, wherein

FIGS. 11A and 11B show the line current of an electronic ballast circuit built according to the embodiment of FIG. 9B and used with a 26 W CFL, at the rated power of the CFL (FIG. 11A) and at 10% of the rated power of the CFL (FIG. 11B);

DETAILED DESCRIPTION OF EMBODIMENTS

Figure 1A:
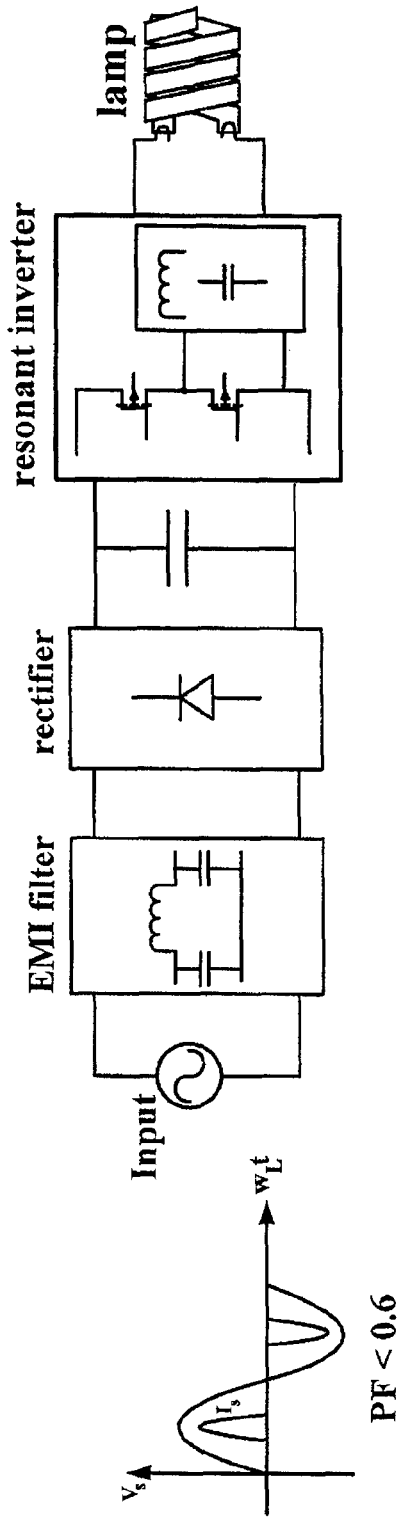
FIGS. 1A and 1B are schematic diagrams of a prior art electronic ballast for a compact fluorescent lamp (CFL) without power factor correction (PFC) (FIG. 1A); and with PFC (FIG. 1B)
Figure 1B:
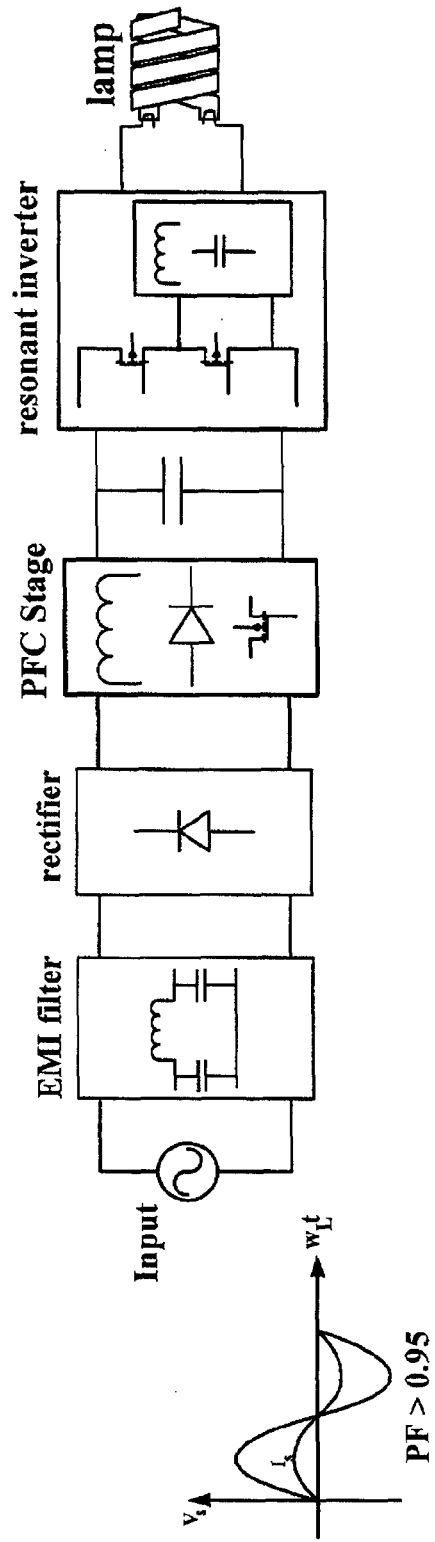

Single-stage resonant inverters combining a PFC converter and a resonant inverter in one stage to provide a cost-effective design approach in T5 and T8 fluorescent lamps are proposed in [3]-[6]. To further reduce the size and cost of the ballast power circuit, single-switch electronic ballasts integrating a class E resonant inverter [10] with the PFC circuit are proposed in [7]-[9], [13]. By operating the PFC stage as either a boost or a buck-boost converter in discontinuous conduction mode (DCM), a very high power factor with desirable harmonics is achieved at the input. However, the main disadvantage of a class E resonant inverter is the high peak voltage and current associated with the switch. The voltage across the switch is π times the input DC voltage of the inverter [9]. Hence, a high voltage MOSFET and/or a heat sink to cool down the temperature in the ballast power circuit may be required.

One aspect of the invention relates to an electronic ballast circuit, also referred to herein as an "electronic ballast", a "ballast circuit", and a "power circuit", that overcomes the large size, high cost, and low efficiency problems of prior ballasts. An electronic ballast circuit as described herein is simple, has a high power factor, and is compact, and is therefore suitable for use in all fluorescent lighting applications. Because the electronic ballast circuit is compact, it is suitable for use with compact fluorescent lamps (CFLs). However, the electronic ballast circuit is also suitable for use with any other fluorescent lamp. For example, it may replace inductive/magnetic ballasts typically used in commercial fluorescent lighting applications in new installations as well as in existing installations (e.g., retro-fits).

In particular, as fluorescent lighting becomes more widespread, largely through use of CFLs, the power factor of low wattage fluorescent lamps (e.g., less than 25 W) becomes more important. That is, although the IEC1000-3-2 standard [2] for harmonics of the line current applies to a fluorescent lamp of 25 W or more, simultaneous use of multiple low wattage lamps suggests that the standard should also apply to low wattage lamps. Use of the embodiments described herein ensures a high power factor with any fluorescent lamp or combination of fluorescent lamps.

An electronic ballast circuit as described herein may be provided alone, for use with a fluorescent lamp, or it may be provided as part of a fluorescent lamp. For example, when provided as part of a fluorescent lamp, the electronic ballast circuit may be integrated into the lamp, such as in the case of a CFL. An electronic ballast circuit as described herein may compensate for brownout conditions (i.e., a line voltage between power out and normal or full line voltage) as well as avoid glow-discharge mode operation of the fluorescent lamp.

The electronic ballast circuit may include a power factor correction stage and an inverter. The power factor correction stage may be of a topology selected from, but not limited to, single ended primary inductor converter, boost, buck-boost, and flyback. The inverter may be a resonant inverter, such as, for example, a current fed inverter. The inverter may be a single-switch inverter.

In one embodiment the electronic ballast includes a combined power factor correction (PFC) stage and a resonant inverter, using a shared switch. That is, a switch is shared between the PFC stage and the inverter. The shared switch may be the only switch, as in embodiments where a single-switch power inverter, such as a resonant inverter, is used. Relative to prior designs, such an embodiment of the electronic ballast circuit eliminates the need for two or more switches in the power circuit, and accordingly the switch driver circuit is simplified with the elimination of isolation devices. Further, the high magnitude resonant current is prevented from flowing through the switch. The switch conduction loss is thus significantly reduced and high efficiency maintained in the power circuit.

Figure 2A:
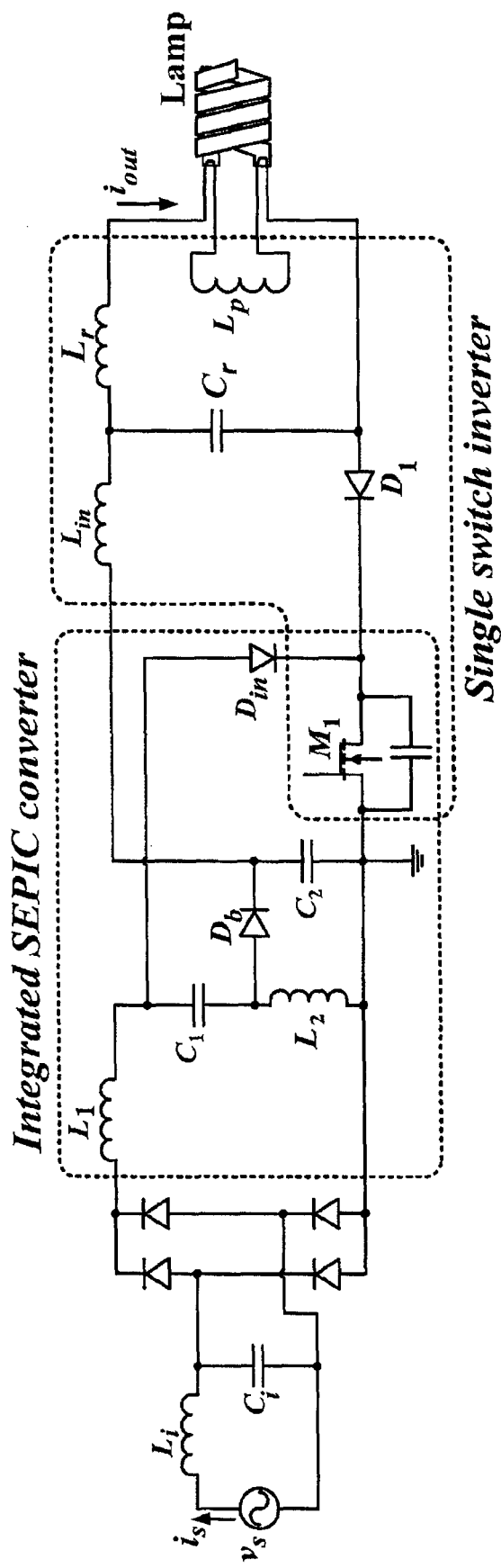
FIG. 2A is a diagram of a single switch electronic ballast according to one embodiment of the invention.

A single switch electronic ballast according to one embodiment is shown in the schematic diagram of FIG. 2A. This embodiment is based on a cascade combination of a single ended primary inductor converter (SEPIC) for the PFC stage and a single switch current fed inverter. Other types of converters may of course be used, such as, for example, boost (see FIG. 2E) or flyback (see FIG. 2F). Such alternative converters may reduce the number of circuit elements and complexity of the electronic ballast. Other converters, such as buck-boost, may also be used, however, use of a converter that employs more than one switch would increase the complexity, cost, and size of the electronic ballast circuit.

The SEPIC may be used for the PFC stage in this embodiment because: (1) it does not require a large size high-voltage DC link capacitor (in contrast with designs using a boost PFC); (2) unlike a discontinuous conduction mode (DCM) operating boost converter, the SEPIC converter DC-link capacitor is not subjected to high voltage stress in order to achieve a high power factor [11]; (3) the output DC link voltage polarity is not inverted (in contrast with designs employing a buck-boost converter), which allows simpler circuit configuration and input EMI filter designs [12]. Further, relative to prior designs based on boost and buck-boost converters, the SEPIC does not include an inductor in the ground path (as can be seen in FIG. 2A), which reduces noise and allows for fewer components in the EMI filter, which allows for smaller size of the ballast circuit. When the SEPIC operates in DCM with a fixed switching frequency, the peak of the DCM inductor current also follows the rectified sinusoidal envelope and a close-to unity power factor is achieved at the input. As a result, a SEPIC converter has all the advantages of boost and buck-boost converters, and only requires an extra inductor and capacitor.

Referring to FIG. 2A, the line voltage is connected to optional an EMI filter including $L_i$ and $C_i$, and then to a rectifier circuit. As an alternative to the EMI filter of FIG. 2A, a common mode EMI filter such as that shown in FIGS. 2E or 2F may also be used. That is, the EMI filters of FIG. 2A and of FIGS. 2E and 2F may be interchanged. The output of the rectifier feeds the SEPIC circuit. The SEPIC includes inductors $L_1$, $L_2$, capacitors $C_1$, $C_2$, diodes $D_b$, $D_{in}$, and a switch $M_1$. The switch is shown with its intrinsic drain-source capacitor. In some embodiments the input EMI filter $L_i$, $C_i$ may be eliminated by properly selecting appropriate (e.g., smaller) values of $L_2$ and $C_1$. This may simplify the design of the entire circuit.

The current fed inverter includes inductors $L_{in}$, $L_r$, $L_p$, capacitor $C_r$, diode $D_1$, and the switch $M_1$. Capacitor $C_r$ and inductors $L_{in}$, $L_r$ form a C-L-L resonant circuit. An alternative arrangement of the inverter is shown in FIG. 2D, wherein inductors $L_r$ and $L_p$ are arranged as a centre-tapped inductor or an autotransformer. It is noted that the arrangement of FIG. 2D may be used with the electronic ballast circuits of FIGS. 2A, 2E, and 2F. The switch $M_1$ is operated by providing a suitable signal to the control or gate terminal. Thus, as can be seen, the switch is shared between the SEPIC circuit and the inverter circuit.

The switch may be a MOSFET or other suitable switching device, such as, for example, IGBT (insulated gate bipolar transistor), or MCT (MOS controlled thyristor). A bipolar transistor may also be used, with appropriate driver circuit. Selection of a suitable switching device may depend on factors such as power handling capability of the switch, as will be apparent to one of ordinary skill in the art.

Operation of the switch may be achieved many different ways, and includes setting the duty ratio of the switch. For example, in one embodiment the switch may be operated at a fixed duty ratio by providing a fixed pulse signal to the gate terminal. Such an embodiment is shown in FIG. 2B. This embodiment may provide stable operation of the ballast circuit at normal line voltages and also during brownout conditions with proper selection of the duty ratio. The duty ratio may be selected for, e.g., worst-case brownout conditions, characterized by, e.g., a selected percentage drop in the line voltage. The duty ratio may be calculated using equations (15) and (16) below, solving for d.

An example of how the switch may be operated with a variable duty ratio is shown in the embodiment of FIG. 2C. This embodiment tracks the line voltage and provides a variable duty ratio signal to the switch so as to compensate for fluctuations in the line voltage, including brownout. This embodiment uses the DC voltage from the ballast circuit and a reference voltage to generate an error signal which determines the duty ratio. This embodiment may compensate for a line low voltage and avoid glow-discharge mode operation. In a further embodiment the reference voltage may be adjusted to compensate for brownout and/or to avoid glow-discharge mode operation. A variable reference voltage may be used for this purpose.

Description of Operation

Figure 3:
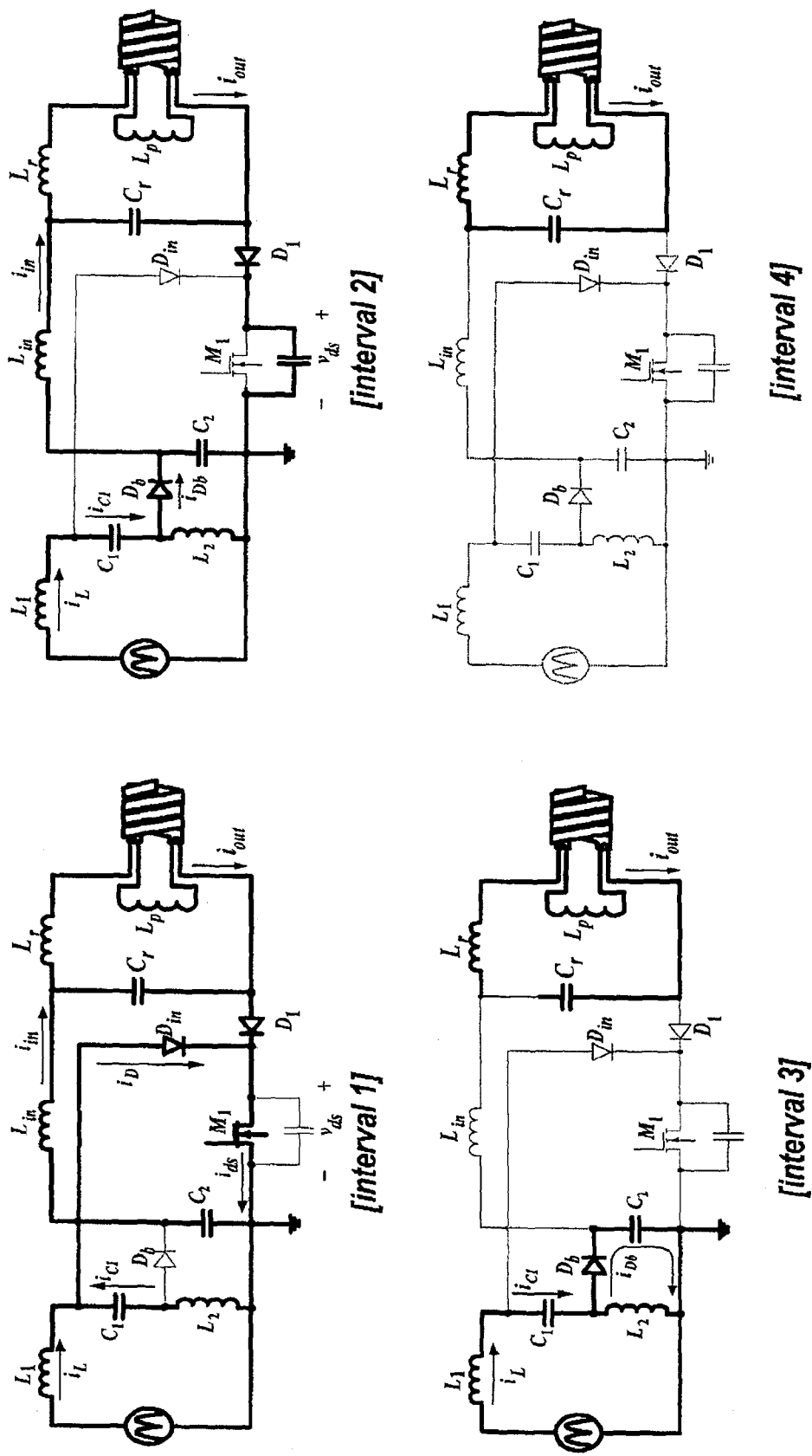
FIG. 3 shows operation of the embodiment of FIG. 2A over four intervals.
Figure 4:
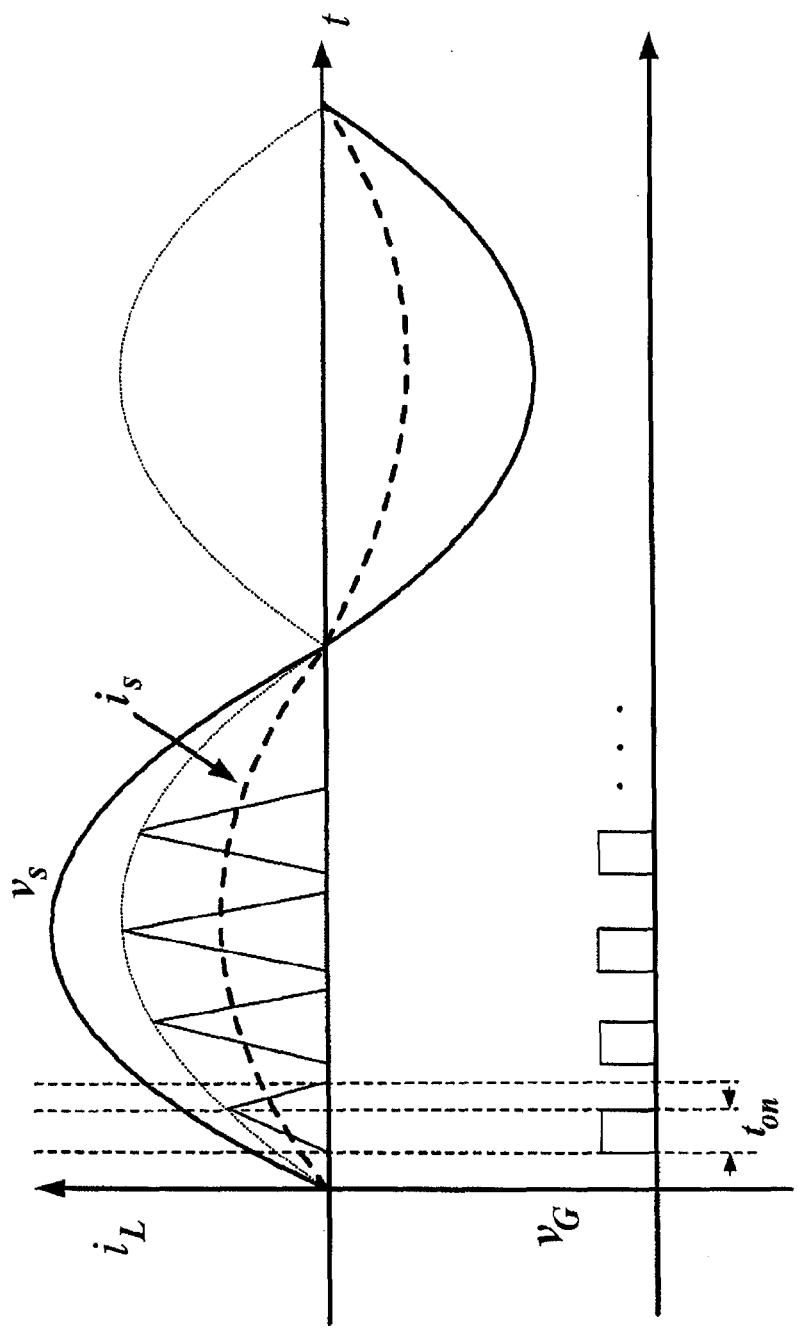
FIG. 4 shows input waveforms at the power factor correction side of the embodiment of FIG. 2A.
Figure 5:
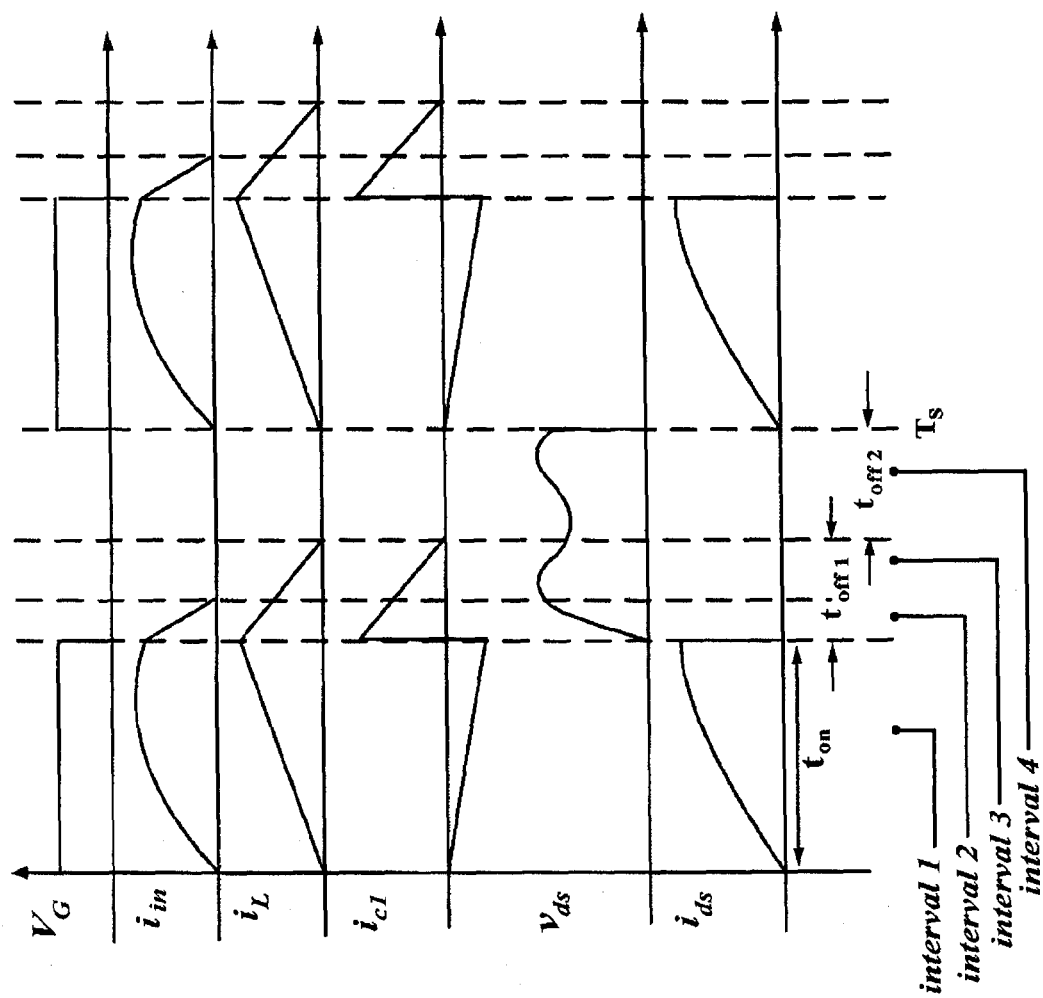
FIG. 5 shows key waveforms of the embodiment of FIG. 2A.

Operation of the embodiment of FIG. 2A is described below with reference to FIG. 3 which shows the operating stages (intervals 1 to 4), with key waveforms shown in FIG. 4. FIG. 5 shows operating waveforms at the PFC side to achieve high power factor in DCM.

Let the input line voltage be: $v_s(t) = V_p \sin(2\pi f_L t)$ with $V_p$=peak line voltage and $f_L$=line frequency; the average current ($i_{s,avg}(t)$) drawn from the line is given in (1), where $L_{eq}=(L_1 L_2)/(L_1+L_2)$ [12], $T_s$=switching period and d =duty ratio. It is observed from (1) that $i_{s,avg}(t)$ is pure sinusoidal and is in phase with $v_s(t)$. Hence, a very high power factor is achieved at the input. The input average power equation is derived from (1) as given in (2).

[interval 1]: $M_1$ is on, $i_L$ rises linearly, begins to increase slowly due to the presence of $L_{in}$ so that close to zero-current switching is provided at the turn-on of the MOSFET. The total current flowing through the switch is $i_{ds}$.

[interval 2]: $M_1$ is off, $i_L$ decreases linearly. Current $i_{in}$ flows through $C_{oss}$ and decreases until it drops to zero.

[interval 3]: $i_L$ continues to decrease linearly until it drops to zero, then $i_L$ enters the discontinuous conduction period.

[interval 4]: all the diodes are off and the resonant circuit continues to deliver the required energy to the output.

$$i_{s,avg}(t) = \frac{1}{T_s} \int_0^{T_s} i_s(t) \, d(\omega t) = \frac{V_p d^2 T_s}{2 L_{eq}} \sin(2\pi f_L t) \quad (1)$$

$$P_{avg} = \frac{1}{T_s} \int_0^{T_s} v_s(t) i_{s,avg}(t) \, d(\omega t) = \frac{V_p^2 d^2 T_s}{4 L_{eq}} \quad (2)$$

Analysis of Resonant Inverter

The corner frequency ($f_r$) and the quality factor equation of the C-L-L resonant inverter are determined by (3) and (4) respectively. As the voltage generated across $C_r$ is a close-to sinusoidal waveform, proper lamp current balancing is ensured at the output of the inverter circuit. If a high enough quality factor (Q) is chosen in the resonant circuit, then close-to-sinusoidal waveforms can be achieved at the output and fundamental approximation can be used in the linear analysis of the resonant circuit. During lamp ignition, the lamp resistance ($R_{lamp}$) is infinite and the resonant circuit becomes a parallel L-C circuit. The output voltage of the lamp during this phase is given in (5). By solving (5), the corresponding ignition frequency may be obtained as given in (6), where $L_T=L_r+L_p$ and $I_{in}$ is the amplitude of $i_{in}$.

After the lamp is ignited, the gas within the lamp becomes ionized and the lamp resistance decreases to a few hundred ohms. The resonant circuit now becomes a C-L-L resonant tank with a finite value of lamp resistance. The output lamp current is then calculated using the current gain relationship as shown in (7), where $i_{in,1}$ is the fundamental component of $i_{in}$, $k=L_p/L_r$ and $\omega_s$ is the angular switching frequency.

$$f_r = \frac{1}{2\pi\sqrt{L_r C_r}} \quad (3)$$

$$Q = \frac{2\pi f_r L_r}{R_{lamp}} \quad (4)$$

$$\left|\frac{V_{out}(j\omega)}{i_{in,1}(j\omega)}\right| = \frac{\omega L_p}{1 - \omega^2 L_T C_r} \quad (5)$$

$$f_{ign} = \frac{I_{in}}{2\pi}\left(\frac{\sqrt{L_p^2 + 4\frac{V_{ign}^2 L_T C_r}{I_{in}^2}} - L_p}{2 V_{ign} L_T C}\right) \quad (6)$$

$$\left|\frac{i_{out}(j\omega)}{i_{in,1}(j\omega)}\right| = \frac{1}{\sqrt{\left[1 - \left(\frac{\omega_s}{\omega_o}\right)^2\right]^2 + \left[\left(\frac{1}{Q}\right)\left(1 + \frac{1}{k}\right)\left(\frac{\omega_s}{\omega_o}\right) - \left(\frac{1}{Q}\right)\left(\frac{1}{k}\right)\left(\frac{\omega_o}{\omega_s}\right)\right]^2}} \quad (7)$$

Component Stress Analysis

The active components in a single stage or single switch converter may be subjected to high voltage or current stress when compared to a conventional two stage converter to achieve the same power level. Here, the voltage and current stress across the switch of the embodiment of FIG. 2A are investigated.

As mentioned above, when the MOSFET conducts, the current components include $i_L$, $i_{C1}$, and $i_{in}$. Hence, the maximum current stress occurs at the end of the conduction time of the switch, which is given in (8), where $i_{L,pk}$ is the peak current of inductor $L_1$, $i_{C1,pk}$ is the peak current of inductor $L_2$, and $i_{in,pk}$ is the peak of the inverter input current. Since the voltage across $C_1$ is equal to the rectified line voltage, $i_{C1,pk}$ and $i_{L,pk}$ can be combined and the corresponding equivalent inductance is represented by $L_{eq}$. In (8), $v_{cr}(t)$ represents the voltage across capacitor $C_r$, which is the sum of the voltage across inductor $L_r$ and the lamp voltage $v_o(t)$; $V_{dc}$ is the DC link voltage across $C_2$ and $V_{rect}$ is the rectified line voltage. The voltage gain relationship between $V_{dc}$ and $V_{rect}$ is given in (9). Assuming that a close-to-sinusoidal waveform is achieved at the output, i.e., $v_o(t)=V_o\cos(\omega_s t)$, $v_{cr}(t)$ will also be a close-to-sinusoidal waveform with a phase angle of $\phi$. The final expression in (8) is expressed in terms of $v_o$, $V_{dc}$, and $V_{pk}$, which are all known quantities so that the maximum current stress can be calculated. The peak current flowing through $D_1$, $D_{in}$, and $D_b$ are also given in (10), (11), and (12) accordingly.

The rms voltage stress across the MOSFET when the MOSFET is off is given in (13). It is obtained by using Kirchhoff's Voltage Law, where $v_{L,in}(t)$ is the voltage across inductor $L_{in}$. Since the current flowing through $L_{in}$ is almost equal to zero when the MOSFET is off, $v_{L,in}(t)$ is almost equal to zero as well during the switch off period. Using $v_{cr}(t)$ derived earlier in (8) and substituting it in (13) gives a good approximation of the rms voltage across the switch.

$$i_{ds,max} = i_{L1,pk} + i_{C1,pk} + i_{in,pk} \quad (8)$$

$$= \frac{V_{pk}}{L_1}dT_s + \frac{V_{C1}}{L_2}dT_s + \int_0^{t_{on}}\frac{V_{dc} - v_{cr}(t-\varphi)}{L_{in}}dt$$

$$= \frac{V_{pk}}{L_{eq}}dT_s + \frac{V_{dc}}{L_{in}}dT_s + \frac{1}{L_{in}}\left(1 + \frac{L_r}{L_p}\right)\int_0^{t_{on}}v_o(t)dt + \frac{L_r}{L_{in}R_{lamp}}v_o(t)$$

$$\frac{V_{dc}}{V_{rect}} = \frac{d}{1-d} \quad (9)$$

$$i_{D1,pk} = \frac{V_{dc}}{L_{in}}dT_s + \frac{1}{L_{in}}\left(1 + \frac{L_r}{L_p}\right)\int_0^{t_{on}}v_o(t)dt + \frac{L_r}{L_{in}R_{lamp}}v_o(t) \quad (10)$$

$$i_{D_{in},pk} = \frac{V_{pk}}{L_{eq}}dT_s \quad (11)$$

$$i_{D_b,pk} = i_{D_{in},pk} \quad (12)$$

$$v_{ds,rms} = \sqrt{\frac{1}{T_s}\int_0^{T_s}(V_{dc} - v_{L,in}(t) - v_{cr}(t))^2 dt} \quad (13)$$

$$= \sqrt{\frac{1}{T_s}\int_0^{T_s}\left(V_{dc} - \left(\frac{L_r}{R_{lamp}}\right)\frac{dv_o(t)}{dt} - \left(1 + \frac{L_r}{L_p}\right)v_o(t)\right)^2 dt}$$

Dimmer Function

A standard, commercially available dimmer (e.g., a triac dimmer) as used with an incandescent lamp controls the lamp output power by adjusting the conduction time of the AC input line voltage. A leading edge dimmer (e.g., a triac or thyristor dimmer) is an example of a standard dimmer that chops off the early or leading edge of each half of the AC sine wave. Conduction of the device is controlled by a trigger or firing pulse, and the later the device is fired and starts to conduct, the less power is delivered to the lamp. A trailing edge dimmer (e.g., a transistor dimmer) is an example of a standard dimmer that chops off the late or lagging edge of each half of the AC sine wave. Less power is delivered to the lamp as more of the trailing edge is chopped.

Thus, with standard dimmers, the shorter the conduction time, the less power will be delivered to the output. Hence, the power factor will decrease as the conduction time of the dimmer decreases. The poor power factor obtained from a typical CFL at its full lamp power implies that such dimmers, when placed between the input and the CFL, will result in very poor power factor with extremely high current spike at the input during dimming. As a result, such a dimmer should not be used with a currently available CFL not only because of the poor power factor, but also because the high current spike may exceed the current rating of the circuit components and destroy the electronic ballast.

Proper dimming performance of a fluorescent lamp may require power factor correction at all dimming levels. Commercially-available consumer grade electronic ballasts, such as those found in CFLs, may not include a PFC circuit, or may include a PFC circuit with poor performance. Hence, a commercial CFL produces a poor power factor at the AC main input. For example, when a standard phase-cut (triac) dimmer is used with a CFL, the dimming range of the lamp is very limited. When the lamp is dimmed, flickering is observed at the light output and in some cases, no light is produced at low dimming level. Under conditions where the line voltage drops suddenly (i.e., brownout), the lamp cannot sustain its normal operation.

Another aspect of the invention relates to a dimmer controller circuit for an electronic ballast for a fluorescent lamp. The dimmer controller circuit maintains a high power factor throughout the dimming range, and may compensate for brownout conditions as well as avoid glow-discharge mode operation of the fluorescent lamp.

Figure 9A:
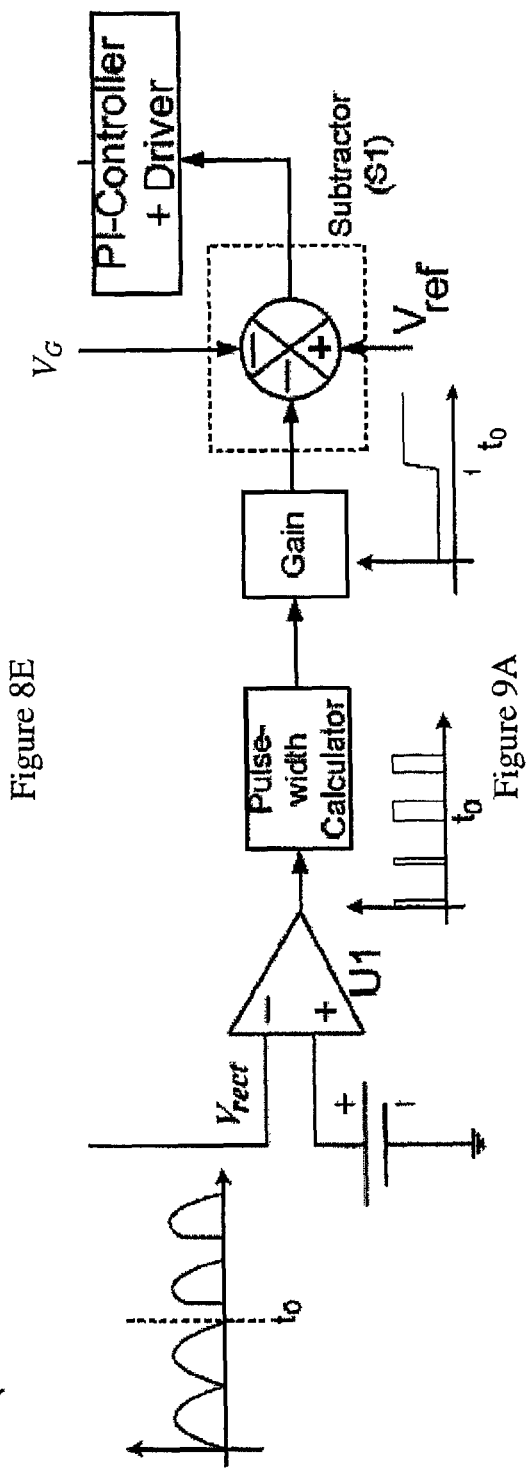
FIG. 9A is a diagram of a dimmer controller for a fluorescent lamp according to one embodiment.

An embodiment of a dimmer controller circuit, which includes a duty ratio controller and a gain multiplier, is shown in FIG. 9A. Referring to FIG. 9A, a conventional triac dimmer (TD) is connected to the input of the duty ratio controller of the dimmer controller. The output lamp power may be controlled by adjusting the pulse width of the switch $M_1$. The AC line voltage is rectified ($V_{rect}$), scaled down (not shown in FIG. 9A or 9B), and compared with a DC signal in the comparator U1. At the output of the comparator, a pulse is generated when the DC signal is higher than $V_{rect}$. When a firing angle is applied at $t_0$, the rectified voltage is chopped and the corresponding pulse width at the output of U1 is increased. This pulse width shows how much firing angle has been applied to the triac. The circuit multiplies this pulse width information by a gain factor and then subtracts this signal from the reference voltage. The end result is that a small firing angle can control a large amount of lamp power so that high power factor is always maintained at the input even during dimming.

Figure 12A:
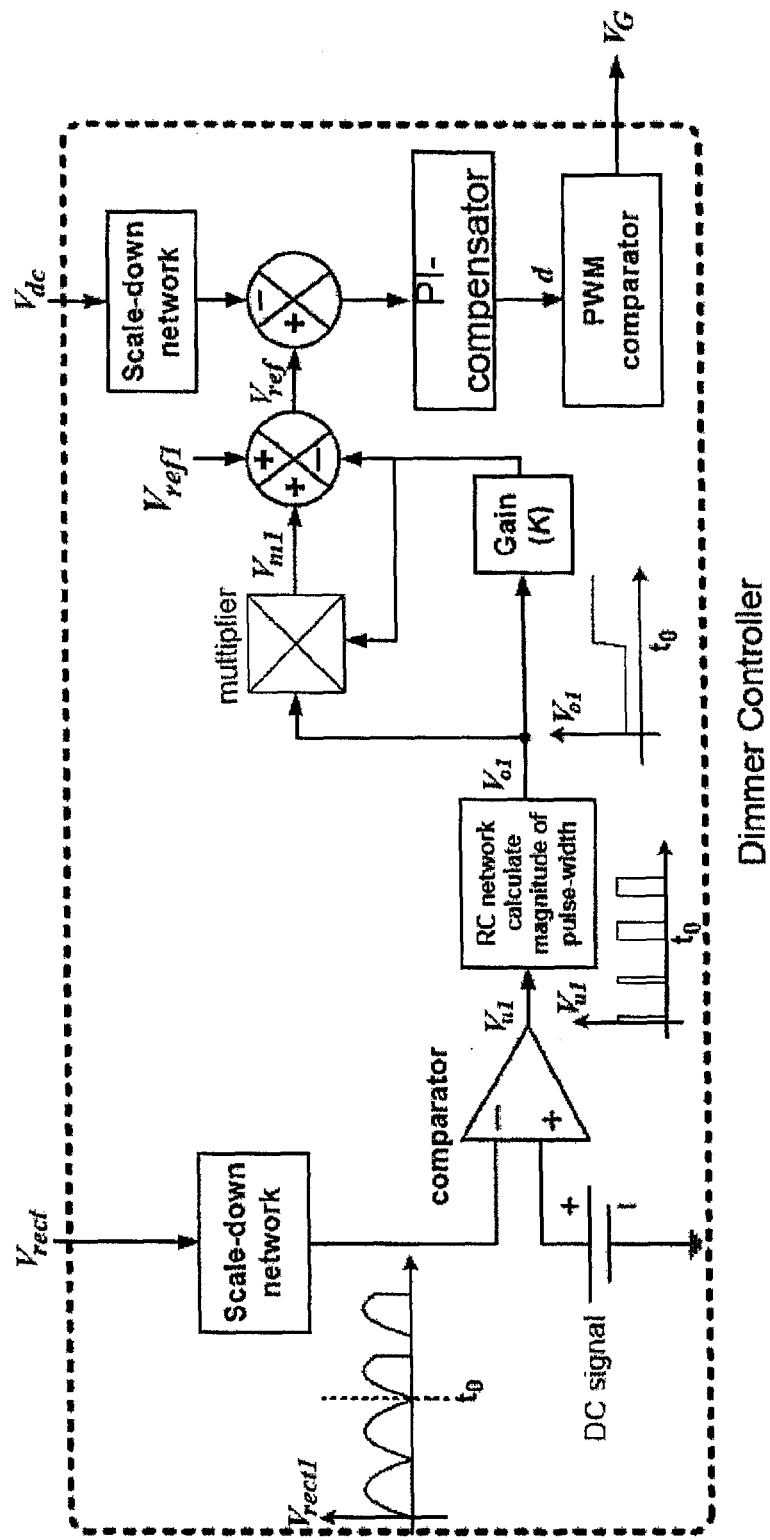
FIG. 12A is a block diagram of a dimmer controller according to another embodiment.

A dimmer controller circuit according to another embodiment is shown in FIG. 12A as used with a trailing edge dimmer. This embodiment, as with all embodiments, may of course also be used with a leading edge dimmer. The embodiments described herein may also be used with a resistive dimmer. This embodiment allows a fluorescent lamp to be dimmed smoothly, and the dimmed light output can be maintained during brownout conditions and when the lamp is switched off and on again. This embodiment also avoids glow-discharge mode operation of the fluorescent lamp. As shown in FIG. 12A, this embodiment includes a gain adjuster that provides a proper signal to be subtracted from a reference signal during dimming. This embodiment also includes duty ratio control and a non-linear function (e.g., a multiplier) to accommodate for the drop in voltage during dimming. When the main power is switched off and then on again during dimming, the multiplier provides a high duty ratio signal to sustain the arc across the lamp.

The dimmer controller may be implemented as a discrete circuit design, using discrete elements and commercially-available semiconductors, or it may be implemented as a single integrated circuit in the form of an analog ASIC, or it may be implemented as firmware implanted in a digital controller. Analog implementations and digital implementations may be equivalent functionally, but offer different overall costs to implement.

Figure 12B:
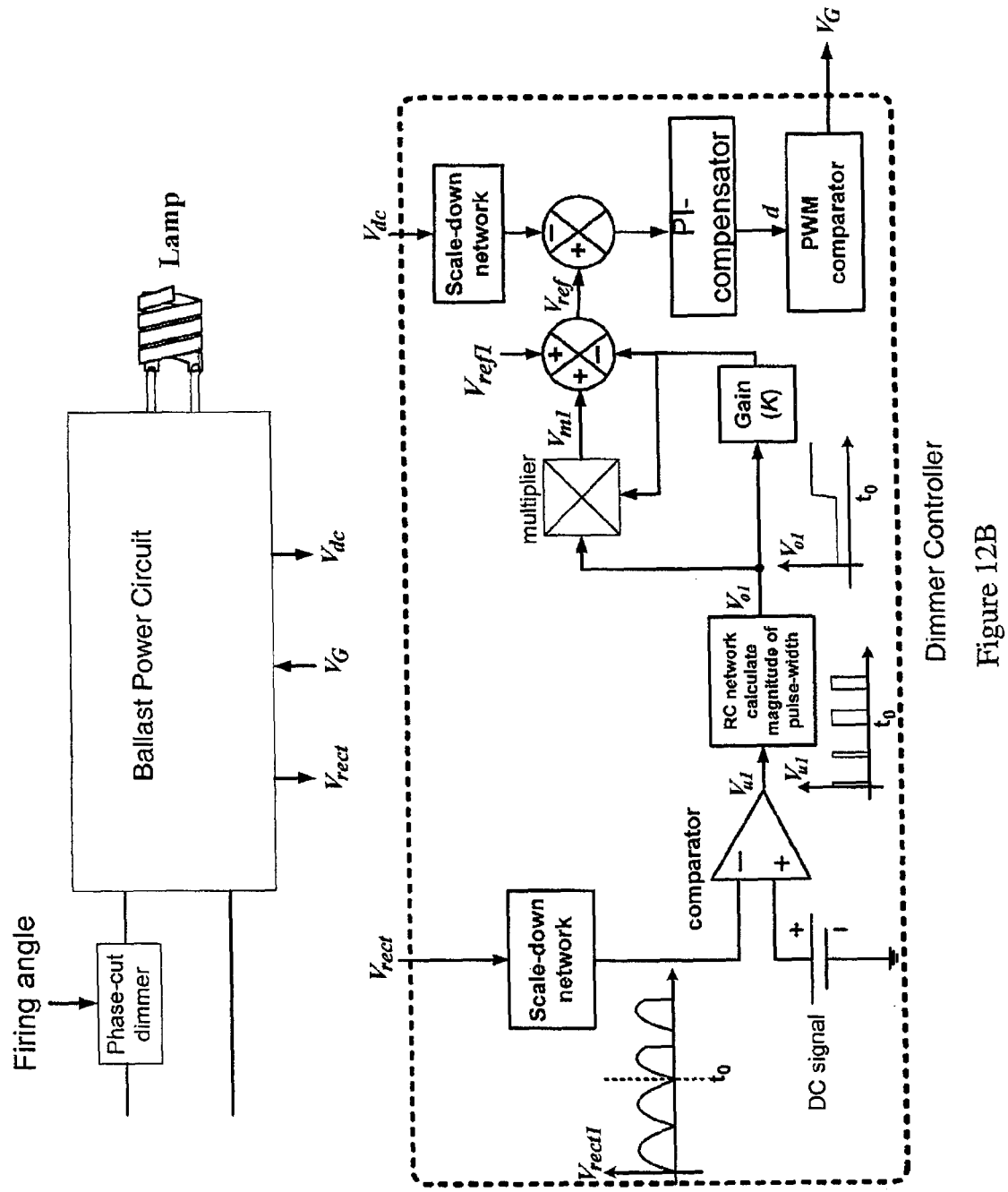
FIG. 12B is a block diagram of a combination comprising an electronic ballast and a dimmer controller according to another embodiment.

A dimmer controller circuit as described herein may be used with a standard dimmer, such as a triac or thyristor dimmer (i.e., a leading edge dimmer) that is typically used with an incandescent. Other dimmers as known in the art, such as transistor dimmers (i.e., trailing edge dimmers) may also be used. The dimmer controller circuit may be provided alone, for use with an electronic ballast, or together with an electronic ballast. In the latter case, the dimmer controller circuit and the electronic ballast circuit may be combined, e.g., substantially or completely in one circuit. Such an embodiment may be produced in a compact size, suitable for use with a CFL. For example, the dimmer controller of the embodiment of FIG. 12A may be combined with the electronic ballast circuit of FIG. 2A, as shown in FIG. 12B. Alternatively, the embodiment of FIG. 12A may be combined with the electronic ballast circuit of FIG. 2E or 2F.

Figure 12C:
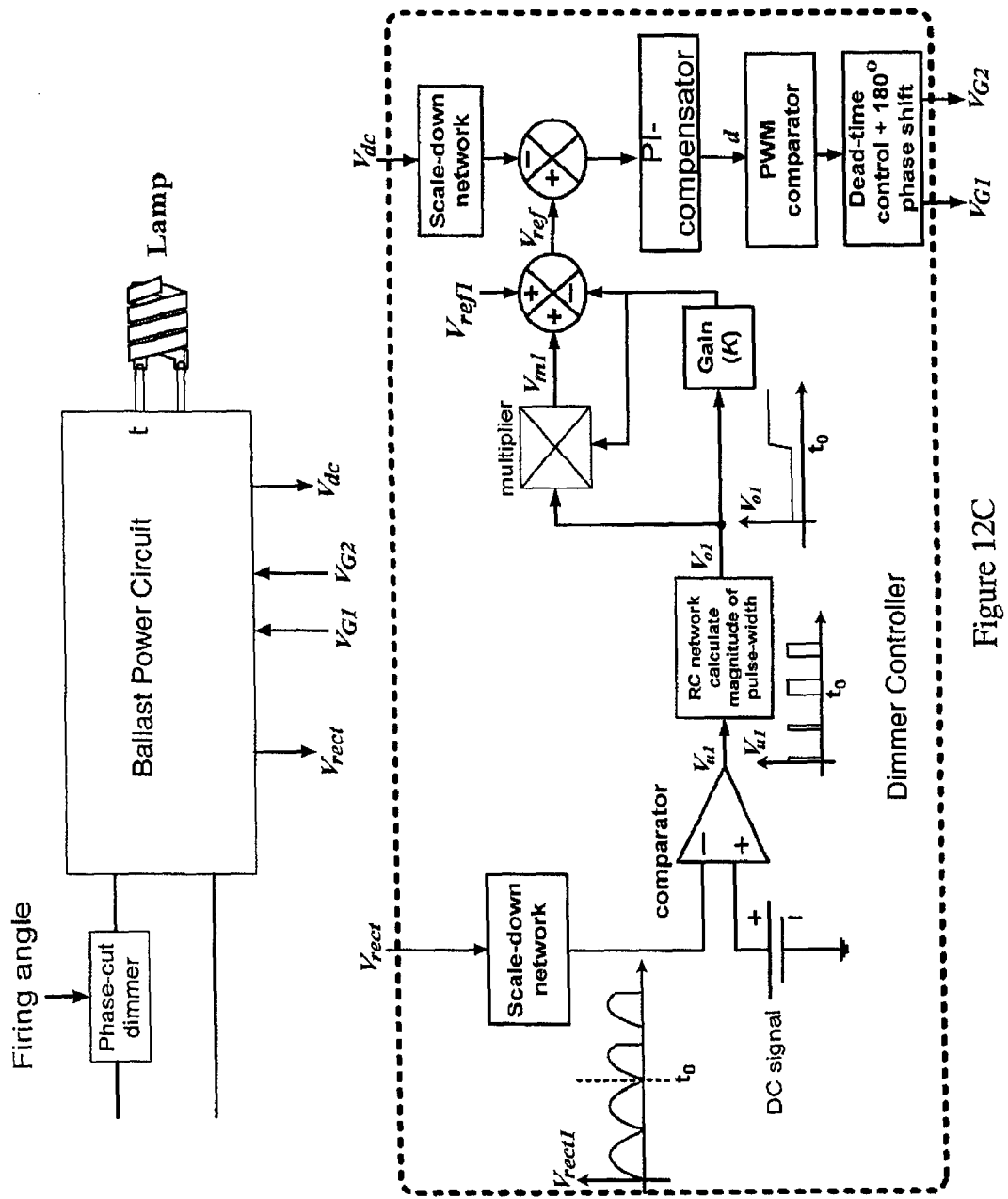
FIG. 12C is a block diagram of a dimmer controller according to another embodiment.

A dimmer controller as described herein may be used with electronic ballasts whose operation is based on duty cycle variation and with electronic ballasts whose operation is based on frequency variation. The embodiments shown in FIGS. 9A and 12A, configured to control a single switch, allow control of the duty ratio substantially from 0 to 100% (i.e., maximum dynamic range of the switch). However, it will be appreciated that a dimmer controller as described herein is not limited to use with single-switch electronic ballast such as that shown in FIG. 2A, 2E, or 2F. The dimmer controller may be configured for use with electronic ballasts having two or more switches by providing drive signals with appropriate duty ratios to each switch. For example, the embodiment of FIG. 12C includes dead-time control and phase shift functions to drive both switches of a two-switch electronic ballast with appropriate duty cycles. Such a dimmer controller may be provided alone, or in combination with an electronic ballast having two or more switches, as shown in FIG. 12C. Such a dimmer controller for two switches allows for variation of the duty ratio substantially from 0 to 50% for each switch.

Another aspect of the invention relates to a combination comprising an electronic ballast and a dimmer controller, for use with a fluorescent lamp. The electronic ballast with dimmer controller has a high power factor throughout the dimming range. The dimmer controller may use a standard, commercially available dimmer, such as a triac dimmer, a transistor dimmer, or a resistive dimmer typically used for an incandescent lamp. The dimmer controller may include a duty ratio controller and a gain multiplier.

Figure 9B:
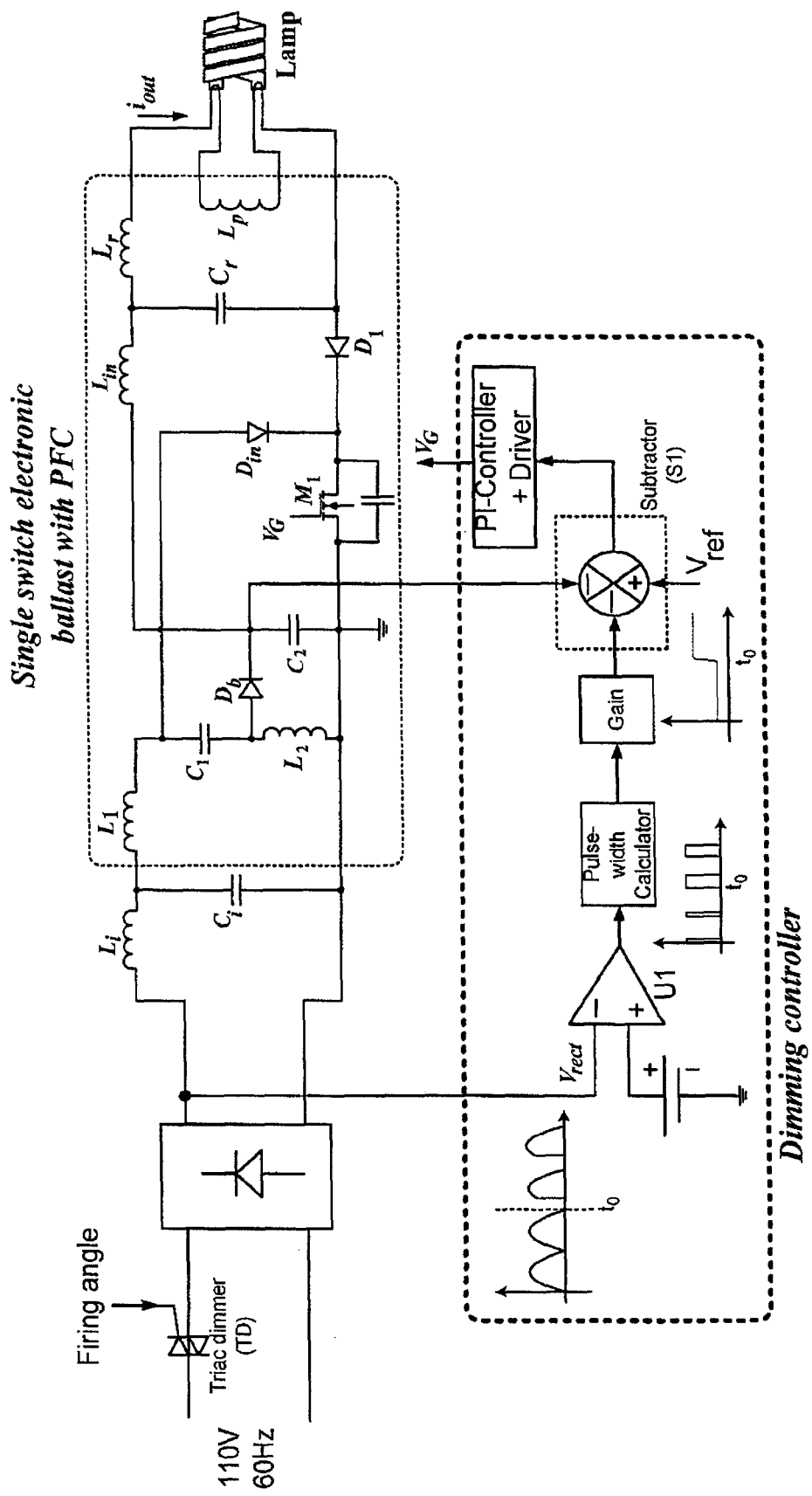
FIG. 9B is a diagram of a combination comprising an electronic ballast based on the embodiment of FIG. 2A and a dimmer controller based on the embodiment of FIG. 9A.
Figure 10:
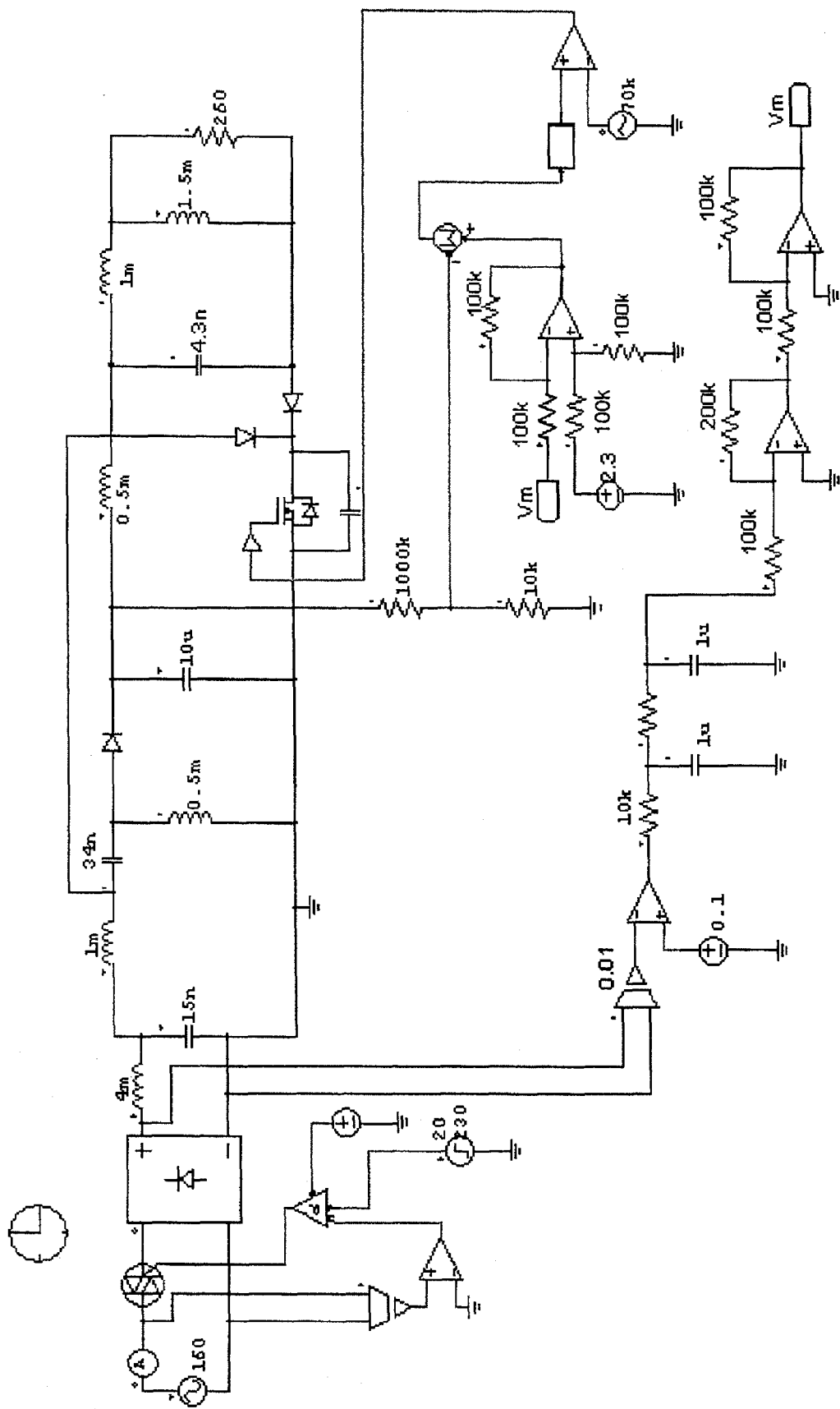
FIG. 10 is a schematic diagram of an electronic ballast circuit built according to the embodiment of FIG. 9B.

One embodiment of the combination includes a high power factor electronic ballast circuit, such as, for example, the embodiment shown in FIG. 2A, 2E, or 2F, and a dimmer controller, such as the embodiment shown in FIG. 9B or FIG. 12A. The dimmer controller may control a wide range of fluorescent lamp light output by adjusting only a narrow range of firing angle. As a result, a change of only several firing angle degrees results in significant drop in the light output. The overall system features high power factor performance throughout the entire dimming range with the electronic ballast power circuit being extremely compact.

An embodiment of a combination comprising an electronic ballast and a dimmer controller is shown in FIG. 12B. This embodiment includes a shared switch electronic ballast such as that shown in FIG. 2A. According to this embodiment, the duty ratio of the switch $M_1$ in the power circuit is controlled. By controlling the duty ratio of the switch, the lamp output power may be adjusted. $V_{rect}$, a feed-forward parameter, carries information of the firing angle applied to the lamp dimmer to the dimmer controller. During normal dimming operation, when part of the sinusoidal line voltage is chopped, the power transferred to the output will naturally decrease. Hence, the duty ratio of the switch does not drop below a selected level so as to avoid glow-discharge mode of the lamp. The gain (K) signal, $V_{o1}*K$, is subtracted from an initial reference, $V_{ref1}$, to force the duty ratio to decrease slightly during dimming. In other words, $V_{ref}=V_{ref1}-V_{o1}K$ during dimming. The multiplier allows a slight increase in the duty ratio to provide a high enough voltage at the output to sustain the lamp arc during dimming. As a result, the output signal of the multiplier is relatively small compared to $V_{ref1}$ so that the presence of the multiplier inside the controller does not affect the normal operation of the ballast circuit.

Figure 12D:
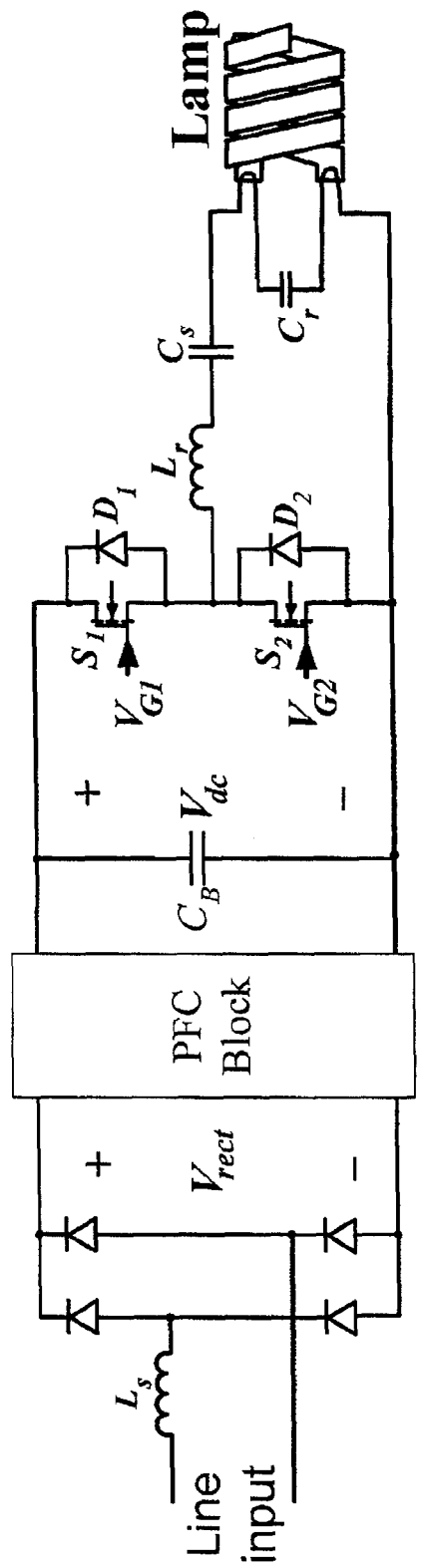
FIG. 12D is a block diagram of an example of a two switch electronic ballast using a conventional half bridge inverter.

It will be appreciated that a dimmer controller as described herein may be used with electronic ballast circuits other than an electronic ballast circuit as described herein. However, modification of the dimmer controller may be required; such as, for example, adding controller/driver stages to drive any additional switches in the ballast circuit. For example, the combination may include an electronic ballast having two or more switches, and a dimmer controller as described herein, such as the embodiment shown in FIG. 12C. An example of such an electronic ballast is a two switch power circuit using a conventional half bridge inverter, as shown in FIG. 12D. Another aspect of the invention relates to a fluorescent lamp including an electronic ballast as described herein. In one embodiment, the fluorescent lamp may include a combination of an electronic ballast circuit and a dimmer controller circuit as described herein. In another embodiment, the fluorescent lamp may be a compact fluorescent lamp (CFL).

Another aspect of the invention relates to a socket for a fluorescent lamp including at least one of an electronic ballast circuit and a dimmer controller circuit. The electronic ballast circuit may be as described herein. The dimmer controller circuit may be as described herein. In one embodiment, the fluorescent lamp may be a CFL.

Figure 12E:
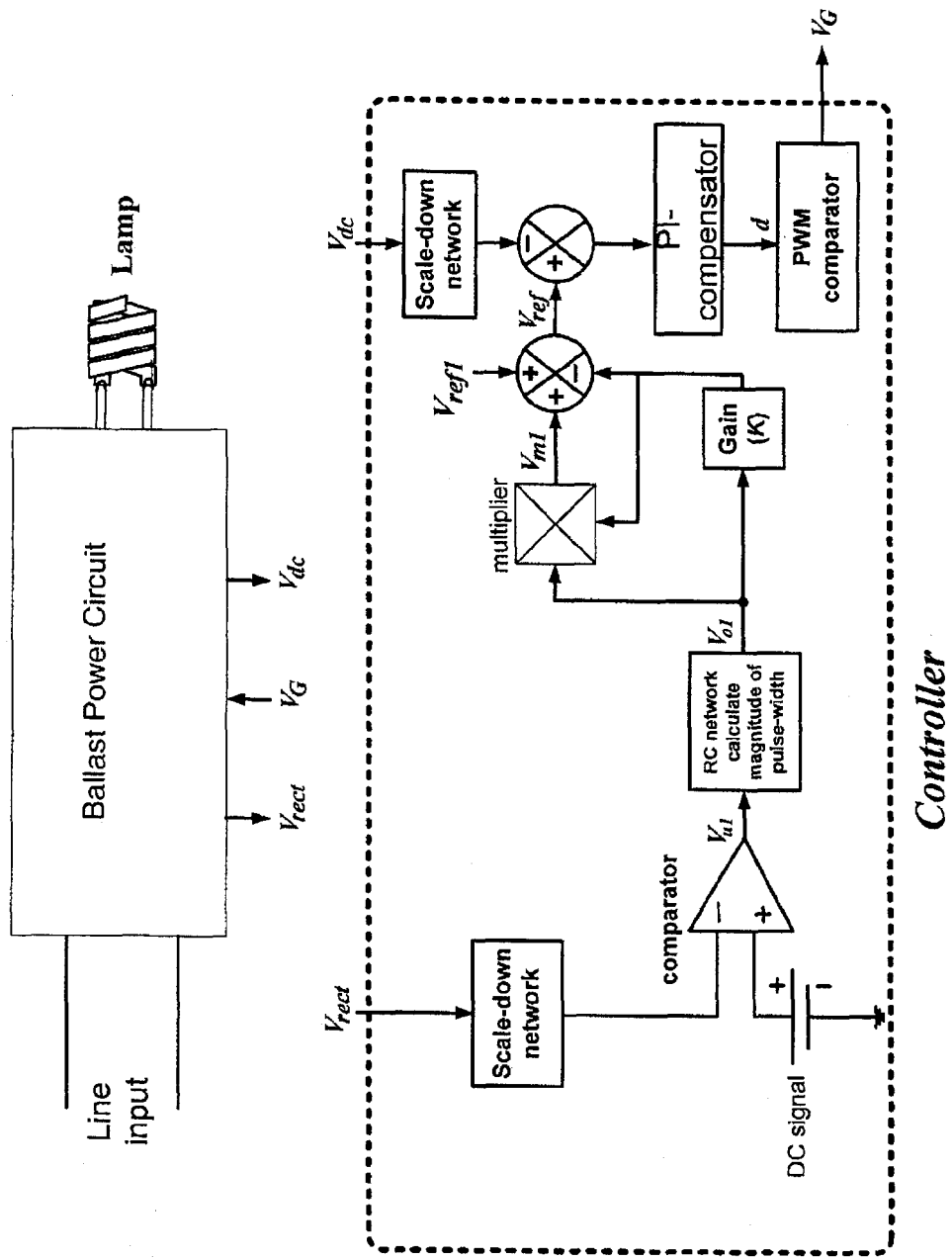
FIG. 12E is a block diagram of a controller without a dimming function, for an electronic ballast, according to an alternative embodiment.

It will be appreciated that in applications where lamp dimming is not required, a dimmer controller as described herein may be used without a dimmer to control an electronic ballast. Here, the controller may be referred to as a ballast controller or simply as a controller. Such an embodiment is shown in FIG. 12E. This arrangement provides operation of the lamp at full brightness and with a very high power factor, and in particular, maintains such operation of the lamp when the line voltage drops below normal levels (e.g., during brownout). Such a controller may be used in all embodiments and aspects described herein, in applications were a dimming function is not required.

Figure 17A:
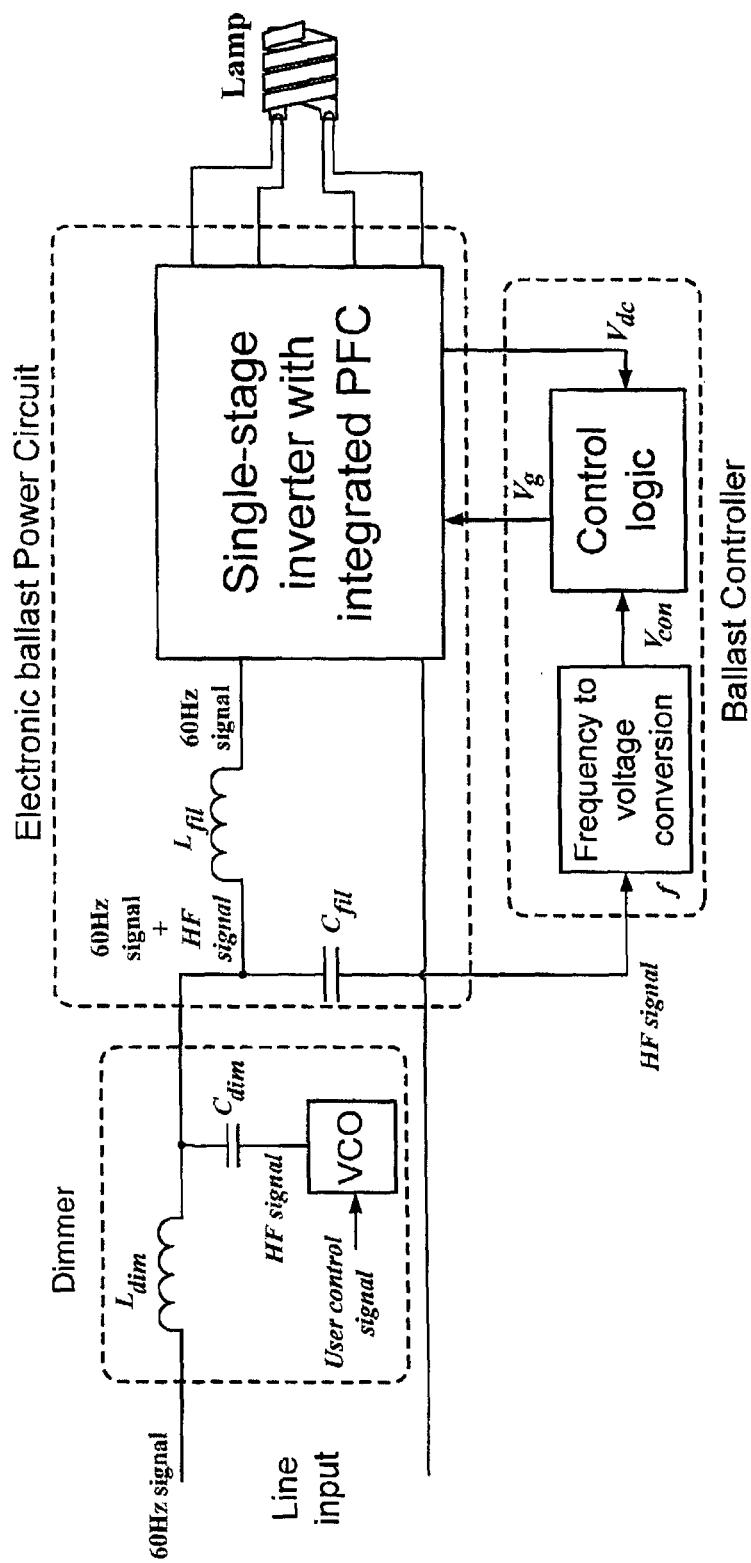
FIG. 17A is a block diagram of an embodiment of a dimmer according to an aspect of the invention, shown with an electronic ballast and a dimmer.

Another aspect of the invention provides a dimmer for use with an electronic ballast and a dimmer controller circuit as described herein to dim a fluorescent lamp, such as a CFL. Conventional incandescent lamp phase-cut dimmers (leading edge or trailing edge) control the light output by adjusting the conduction angle of the input sinusoidal line voltage. One major drawback with such dimmers is that the conduction angle of the line voltage and the line current decrease when the lamp is dimmed. This means the power factor decreases to a low value at very low dimming level. To solve this problem and to maintain simple wiring between the dimmer and the rest of the system, a dimmer as described herein does not control the light output by controlling the conduction angle of the line voltage. Rather, it controls the light output by injecting a high frequency (HF) signal using a voltage-controlled oscillator (VCO). FIG. 17A is a block diagram of an embodiment of the dimmer, interfaced with ballast and dimmer controller circuits as described herein. The frequency range of the high frequency signal should be sufficiently different from the frequency at which components of the electronic ballast circuit operate, to avoid interference. For example, if the electronic ballast operates in the kHz range, the high frequency signal should be in the MHz range. Specific operating frequencies are a matter of design choice and can be easily determined by one of ordinary skill in the art.

As shown in FIG. 17A, the input of the VCO, which is a DC voltage signal, is the user control interface. The controller circuit includes a frequency to voltage conversion block before the control logic block, which includes a PWM comparator. This block converts the HF signal into a DC voltage ($V_{con}$). The higher the frequency of the HF signal, the higher the magnitude of $V_{con}$. This conversion may be done by, for example, detecting time between two zero-crossing points of the HF signal and then converting the value into an appropriate corresponding voltage level. In this embodiment, a higher frequency implies that there is less time required between two zero-crossing points; hence, the output DC voltage level increases inversely and proportionally. Commercially-available ICs such as AD650 (Analog Devices) and LM2917 (National Semiconductor) may be employed for this task. $V_{con}$ is then fed to the PWM block to adjust the duty ratio of the switch of the ballast power circuit, which determines the light output. In the embodiment of FIG. 17A, the HF and low frequency 60 Hz signals need to be separated, and an L-C circuit ($L_{fil}$ and $C_{fil}$) may be used for this purpose.

As noted above, the input of the VCO, which is a variable DC voltage signal, is the user control interface. This may be implemented many different ways, as known in the art. For example, the DC voltage signal may be controlled using a simple potentiometer, or by a computer/microprocessor and/or additional circuitry for ramping the DC voltage signal, which may be carried out manually or automatically in response to one or more stimuli. As to the latter, sensors, such as for voice recognition and/or for sensing one or more of, but not limited to, light (e.g., visible, infra-red, UV), sound (e.g., voice), mechanical stimuli (e.g., vibration, pressure), temperature, humidity/moisture, air movement/wind, or one or more chemicals, may be used in conjunction with such computer/microprocessor and/or additional circuitry to control the DC voltage signal.

As shown in FIG. 17A, the output high frequency signal may be fed to the controller circuit over the same power lines that supply AC power to the electronic ballast circuit. Alternatively, the output high frequency signal may be fed to the controller over separate conductors, or it may be transmitted to the controller using any other suitable technique, such as wirelessly, using, for example, radio waves or infra red light, as known in the art.

Figure 17B:
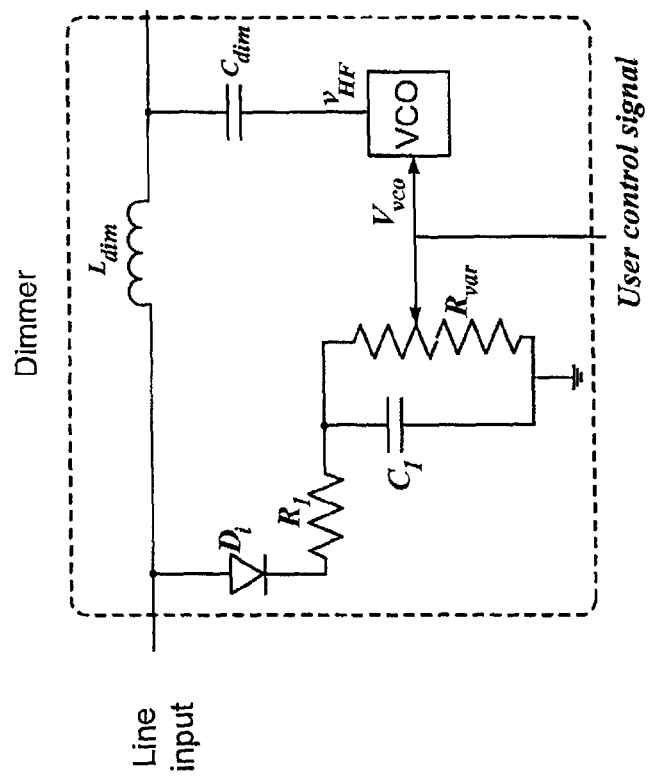
FIG. 17B is a schematic diagram of an embodiment of a dimmer according to an aspect of the invention.

FIG. 17B shows a detailed implementation of an embodiment of the dimmer. This embodiment includes a diode $D_t$, resistor $R_1$ and capacitor $C_1$ which convert the AC line voltage to a DC signal. Resistor $R_{var}$ is a variable voltage divider so that the DC voltage at the input of the VCO can be adjusted by the user.

A dimmer as described herein maintains very high power factor (close to unity) at the AC line input side throughout the entire dimming range, with low cost.

Integrated Controller Power Supply

Another aspect relates to an integrated power supply for a controller for a circuit that outputs power to a lamp. The integrated power supply includes an inductive coupling that receives at least a portion of the output power from the circuit and delivers power to the controller. The circuit may be an electronic ballast for a lamp such as a fluorescent lamp.

In one embodiment an electronic ballast circuit for a fluorescent lamp includes a power circuit that outputs power to the lamp, and an integrated power supply for a controller circuit. The integrated power supply may include an inductive coupling that receives at least a portion of the output power from the power circuit and delivers power to the controller circuit.

Another aspect relates to an electronic ballast circuit for use with a fluorescent lamp, wherein the ballast circuit has an integrated power supply for the controller. A feature of this aspect is the ability of the integrated controller power supply to provide power under both the initial or start-up phase of lamp ignition, and under steady state phase when the lamp is ignited in either full power condition or in dimmed condition. Embodiments may be used without a dimmer, where clean, stable power is provided to the controller that maintains lamp operation at full brightness. Embodiments may also be used with a leading edge or trailing edge dimmer, where clean, stable power is provided to the controller even at low firing angles (i.e, dimmed).

Figure 18:
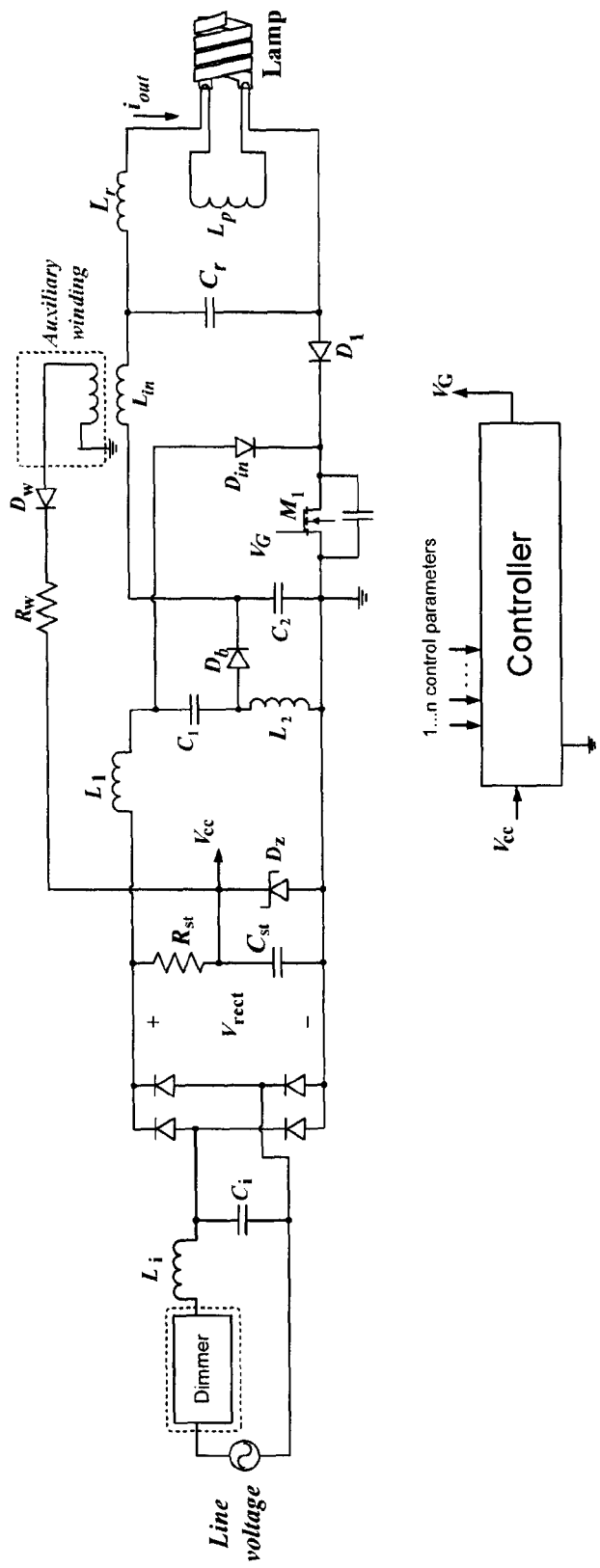
FIG. 18 is a schematic diagram of an embodiment of an electronic ballast circuit with integrated controller power supply.

An embodiment is shown in FIG. 18. This embodiment is based on the electronic ballast circuit of FIG. 2A, and includes further components used to provide clean power to the controller circuit.

Referring to the embodiment of FIG. 18, and comparing it to the embodiment of FIG. 2A, further components associated with power for the start-up phase include resistor $R_{st}$ and capacitor $C_{st}$. These components provide power to the controller during the brief interval when the mains power is switched on but current is not yet flowing in the output stages of the electronic ballast. This interval typically lasts for about 10 to 500 ms. Further components associated with power during the steady state phase include an auxiliary winding associated with output inductor of the ballast circuit, diode $D_w$, resistor $R_w$, and zener diode $D_z$. These components provide power to the controller as soon as current is flowing in the output stages of the electronic ballast. It is noted that the electronic ballast circuit includes an output resonant stage including inductors $L_{in}$ and $L_r$. As the current in these inductors is not affected by dimming, either or both of the inductors may be coupled to the auxiliary winding to produce power for the controller circuit. Thus, the SEPIC topology used in the electronic ballast circuit lends itself to producing power for the controller. However, it will be appreciated that the integrated power supply is not limited to use such ballast circuits. Rather, the integrated power supply may be used with any ballast circuit having an output stage from which power may be coupled so as to supply power to the controller.

A controller for use in accordance with this aspect may include voltage mode or current mode control. The controller may provide a fixed duty ratio control signal to drive the gate of the switch $M_1$. The controller may provide a variable duty ratio signal to drive the gate of the switch $M_1$. For example, the controller may vary the duty ratio of the switch $M_1$ in accordance with one or more parameters associated with operation of the lamp. For example, parameters indicative of problems or hazards (e.g., excessive temperature or current in one or more circuit elements) may be sensed and used to control the duty ratio to mitigate the hazard, or even to shut down the ballast under certain conditions. As another example, parameters indicative of instantaneous operating efficiency of the lamp may be sensed and used to control the duty ratio to optimize efficiency. The controller may be, for example, any of the embodiments described above (see, e.g., FIGS. 9A, 9B, 10, 12A, 12B).

Figure 19A:
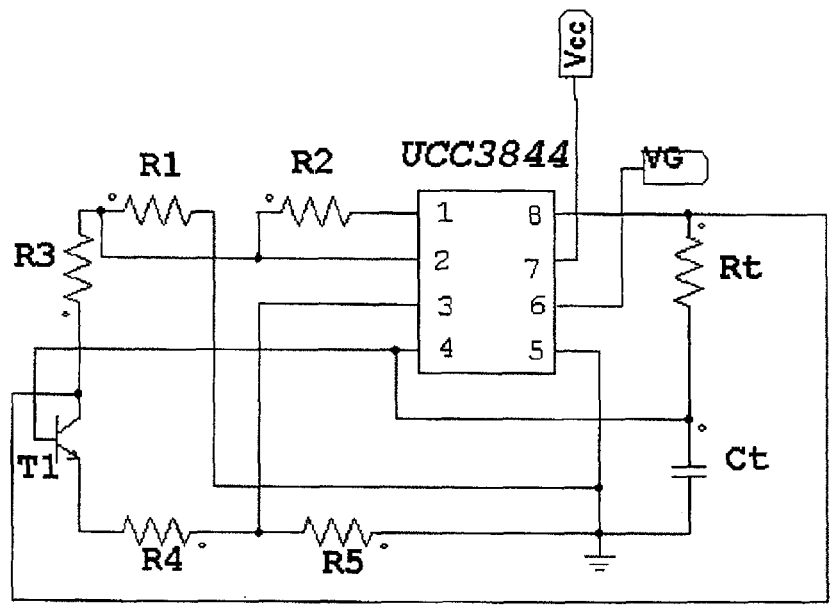
FIGS. 19A and 19B are schematic diagrams of embodiments of controller circuits for use with an electronic ballast circuit.
Figure 19B:
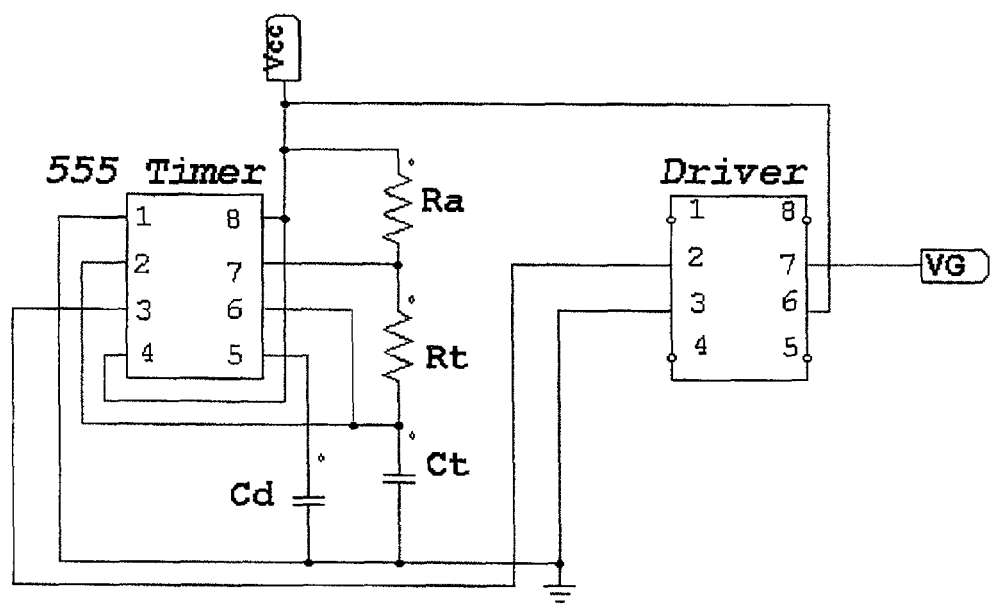

Alternatively, the controller may be implemented with a voltage mode/current mode control IC, such as UCC38C41 or UCC38C44, available from Fairchild Semiconductor. An embodiment of a controller employing such a device is shown in FIG. 19A. As another alternative, the controller may be implemented with a 555 timer IC, such as LM555, available from National Semiconductor. An embodiment of a controller employing such a device, with additional components as may be required, is shown in FIG. 19B.

Embodiments of the invention are further described in the following non-limiting working examples.

WORKING EXAMPLES

1. Electronic Ballast Circuit

Performance of an electronic ballast circuit based on the embodiment of FIG. 2A was verified through simulation and an experimental prototype. A Sylvania Dulux® T/E 4-pin 26 W CFL with $I_{out}$=0.32 $A_{rms}$ was chosen as the testing load for the prototype with a line voltage of 110 $V_{rms}$ 60 Hz. The switching frequency was 70 kHz and the quality factor was 2. The circuit parameters were calculated using the following steps:

(1): $R_{lamp}$ was first calculated using $I_{out}$ and $P_{out}$ as shown in (14). Then the values of $L_r$, $C_r$ and $L_p$ were obtained using (3), (4) and (5) respectively.

$$R_{lamp} = \frac{P_{out}}{I_{out}^2} = \frac{26 \text{ W}}{(0.32 \text{ A})^2} \approx 250 \text{ }\Omega \qquad (14)$$

$$L_r = \frac{QR_{lamp}}{2\pi f_s} = \frac{2(250 \text{ }\Omega)}{2\pi(70\text{kHz})} = 1.1 \text{ mH}$$

$$C_r = \frac{1}{(2\pi f_s)^2 L_r} = \frac{1}{(2\pi 70\text{kHz})^2(1.1 \text{ mH})} = 4.7 \text{ nF}$$

$L_p$ was selected to be higher than $L_r$ so that sufficient high voltage would be guaranteed at the output during lamp ignition. In this example, $L_p$ was selected to be 1.8 mH.

(2): Calculations of $L_1$, $L_2$, $C_2$

The SEPIC inductors ($L_1$ and $L_2$) were calculated by (2) as follows, with $V_{pk}$=155 V; d=0.4; $T_s$=1/70 kHz; and η=90%:

$$L_{eq} = \frac{\eta V_{pk}^2 d^2 T_s}{4P_{avg}} = \frac{0.9(155 \text{ V})^2(0.4)^2(1/70\text{kHz})}{4(26 \text{ W})} \approx 0.55 \text{ mH}$$

Since $L_1$ was chosen to be equal to $L_2$, $L_1$ and $L_2$ were determined from $L_{eq}$ and were 1.2 mH. The output capacitor $C_2$ was obtained by first calculating the mean input resistance of the inverter circuit. This was obtained by equating the input power of the SEPIC circuit and the output power of the SEPIC circuit as given in (15) assuming η=90%. From (15), $R_i$ was calculated to be 2110Ω. $V_{dc}$ was then calculated from (9) with d=0.4 and $V_{pk}$=155 V. $C_2$ was calculated using (16) by allowing a 2% ripple in $V_{dc}$.

$$\frac{\eta V_{pk}^2 d^2 T_s}{4L_{eq}} = \frac{V_{dc}^2}{R_i} \qquad (15)$$

$$C_2 = \frac{V_{dc} d T_s}{\Delta V_{dc} R_i} = \frac{(155 \text{ V})(0.4)(1/70\text{kHz})}{3 \text{ V}(2110 \text{ }\Omega)} \approx 21 \text{ }\mu\text{F} \qquad (16)$$

(3): Selection of MOSFET and diodes

The selection of the MOSFET was determined by both (8) and (13). From (8), the approximated maximum current stress was calculated with $V_{pk}$=155 V, d=0.4, $T_s$=1/70 kHz, $L_{in}$=1.1 mH.

$$i_{ds,max} = \frac{(155 \text{ V})0.4(1/70\text{kHz})}{0.55 \text{ mH}} + \frac{(103 \text{ V})0.4(1/70\text{kHz})}{1.1 \text{ mH}} + 0.3 \text{ A} = 1.95 \text{ A}$$

The rms switch voltage was determined to be 460 V using (13). To meet these two requirements, the MOSFET SPA06N60C3 (Infineon, Milpitas, Calif., USA) was chosen for this design. For the diodes, ultra-fast recovery diodes are required for diodes $D_b$, $D_{in}$, and $D_1$. As illustrated in (10)-(12), the maximum current flowing through $D_b$ and $D_{in}$ are equal to the peak of the DCM inductor current; whereas the maximum current going through $D_1$ is equal to the peak of $i_{in}$. Hence, MUR1560 was selected for these diodes.

Simulation and Experimental Results

Figure 6A:
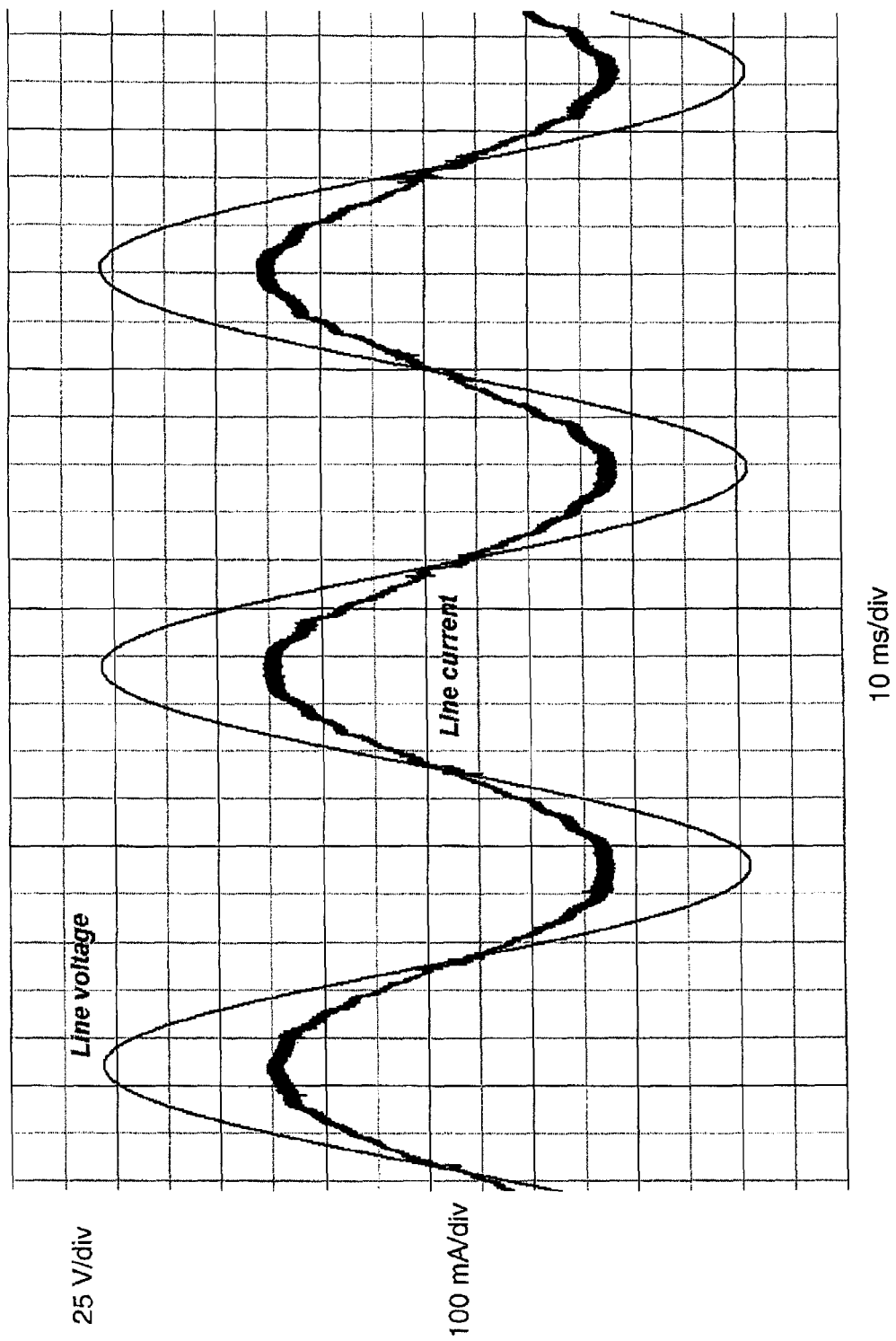
FIG. 6A shows the line current.
Figure 6B:
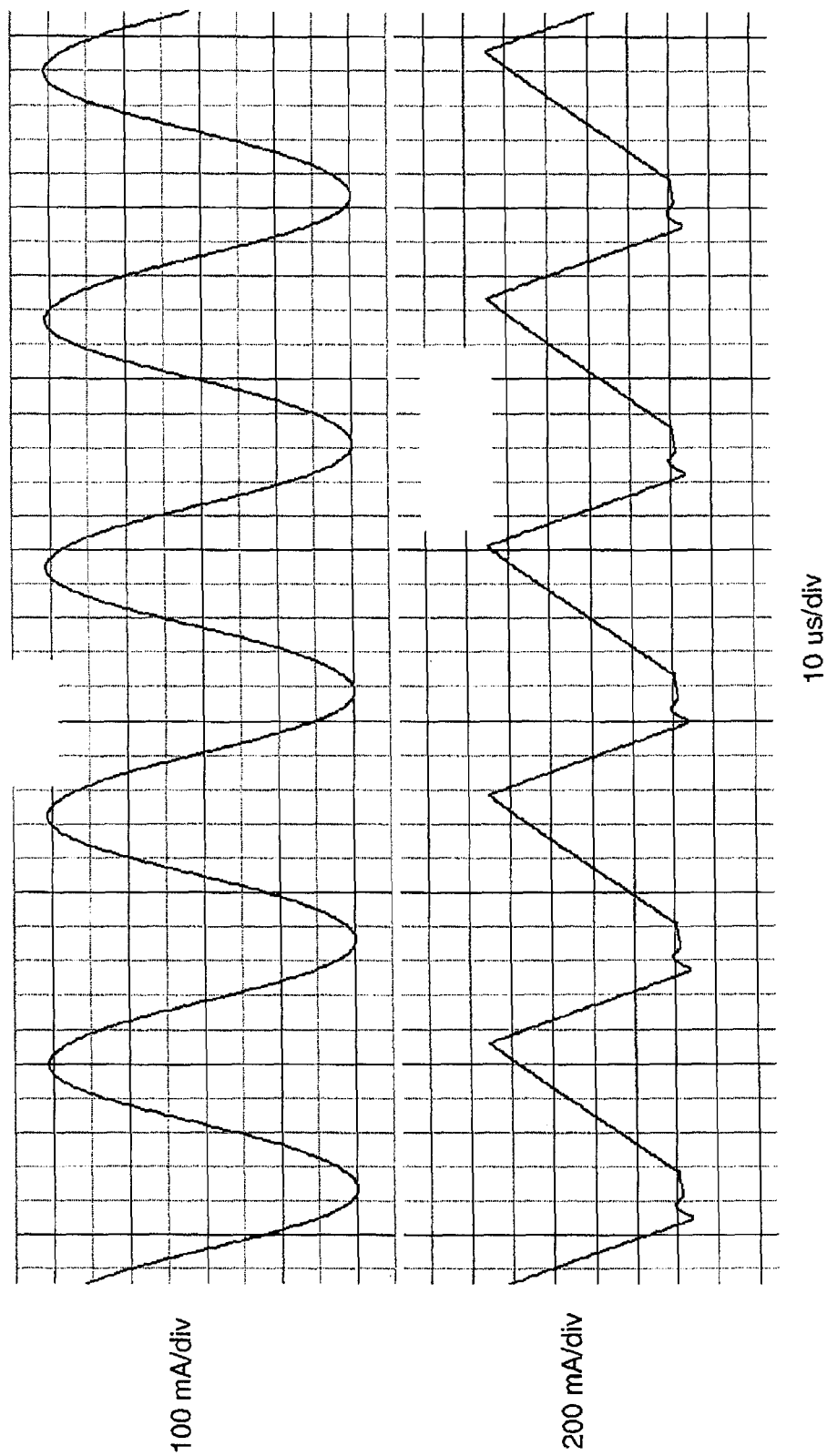
FIG. 6B shows the simulated output current (upper trace) and PFC inductor current (lower trace)
Figure 6C:
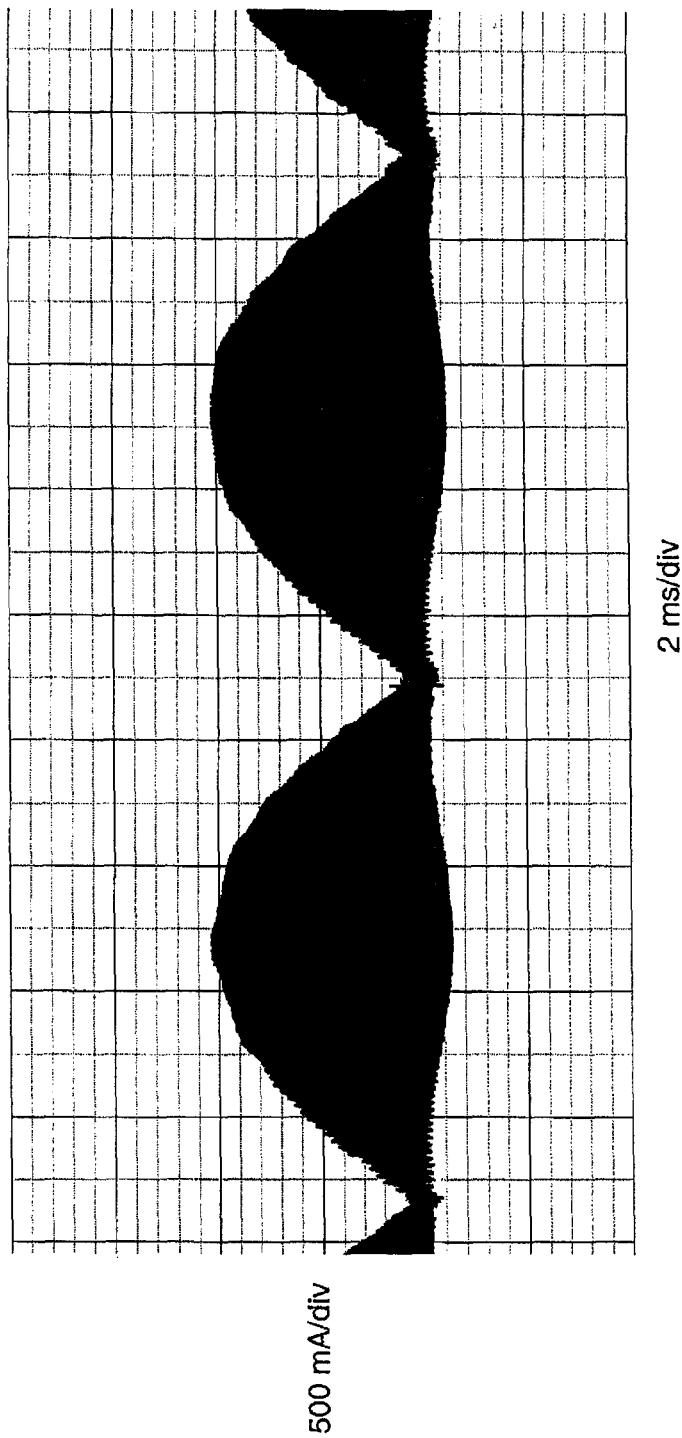
FIG. 6C shows the low frequency component of the simulated DCM input inductor current.

The circuit simulation was verified in SIMETRIX 5.0 circuit simulation software (Catena, Thatcham, Berkshire, UK). FIG. 6A shows the simulated line current, where a power factor of 0.995 was achieved. FIG. 6B shows the simulated output current $i_{out}$ and PFC inductor current $i_L$. FIG. 6C shows the low frequency component of the simulated DCM input inductor current.

Figure 7:
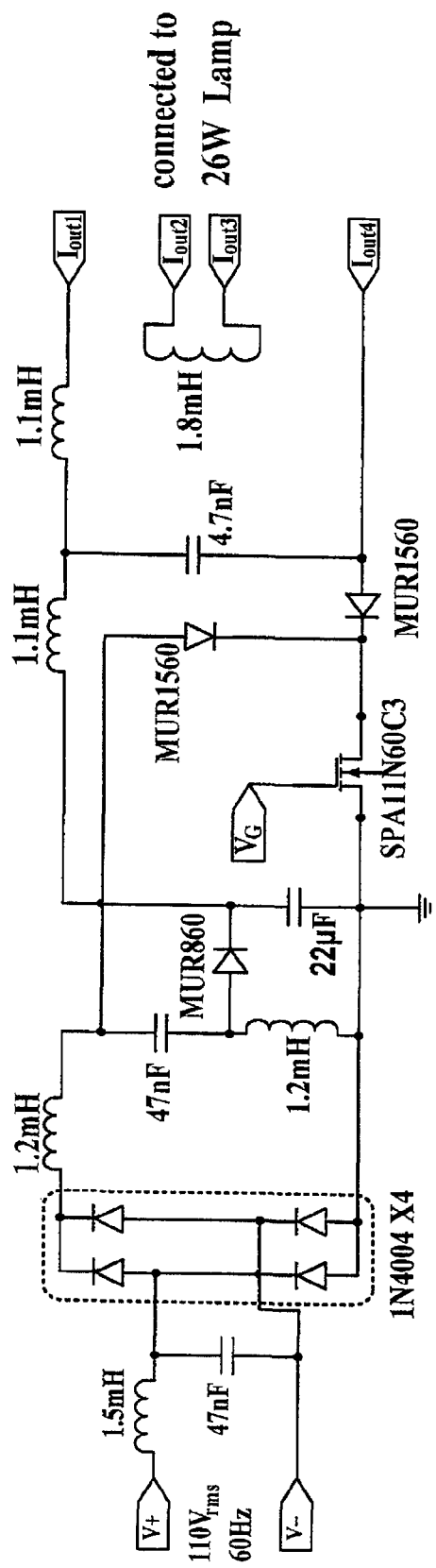
FIG. 7 is a schematic diagram of an electronic ballast circuit built according to the embodiment of FIG. 2A.
Figure 8A:
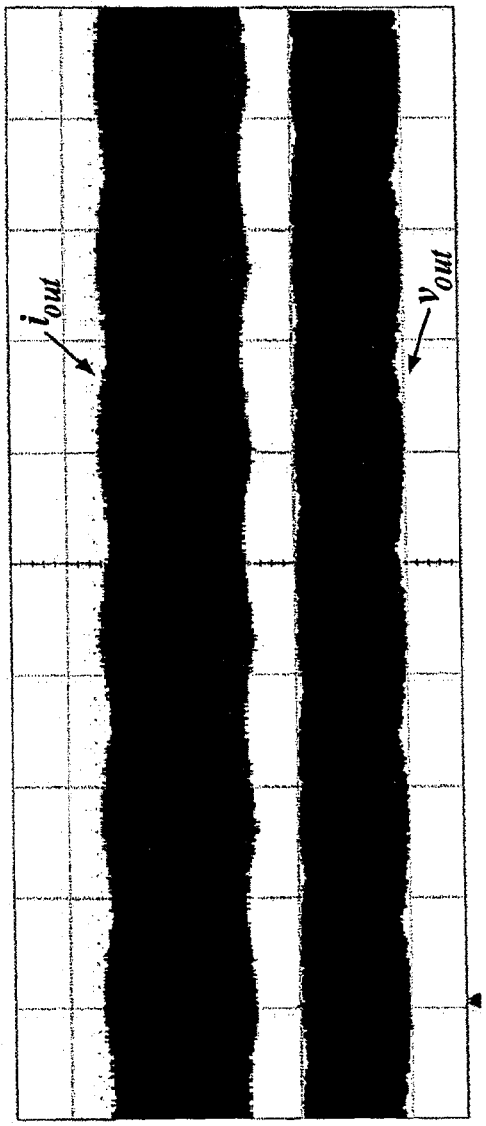
FIG. 8A shows the lamp current and voltage.
Figure 8B:
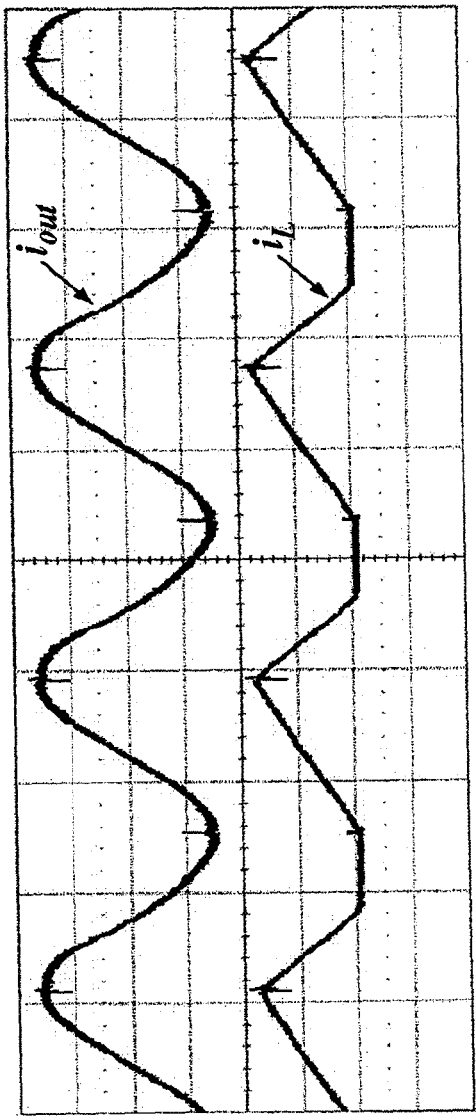
FIG. 8B shows the lamp current and discontinuous conduction mode (DCM) inductor current.
Figure 8C:
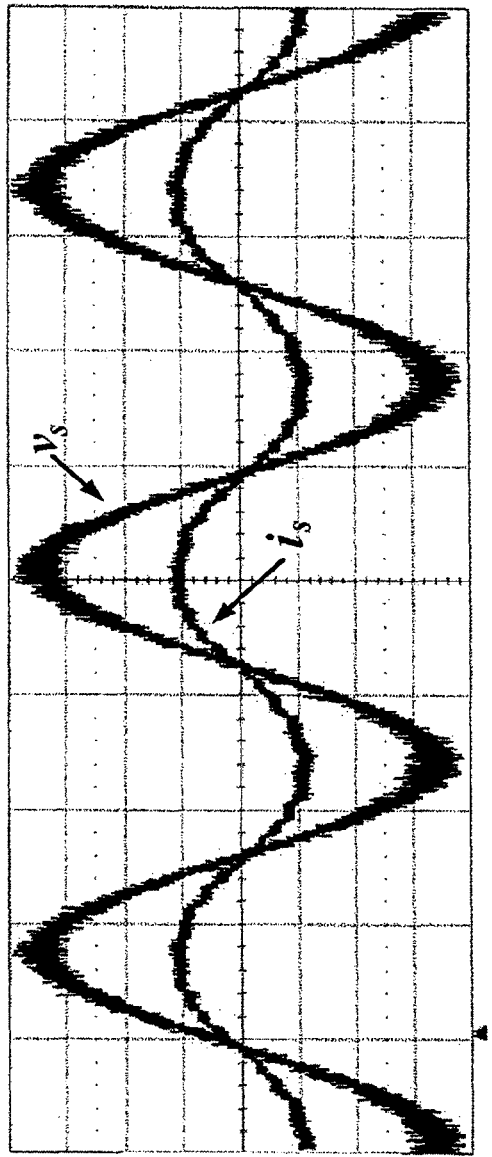
FIG. 8C shows the line current.
Figure 8D:
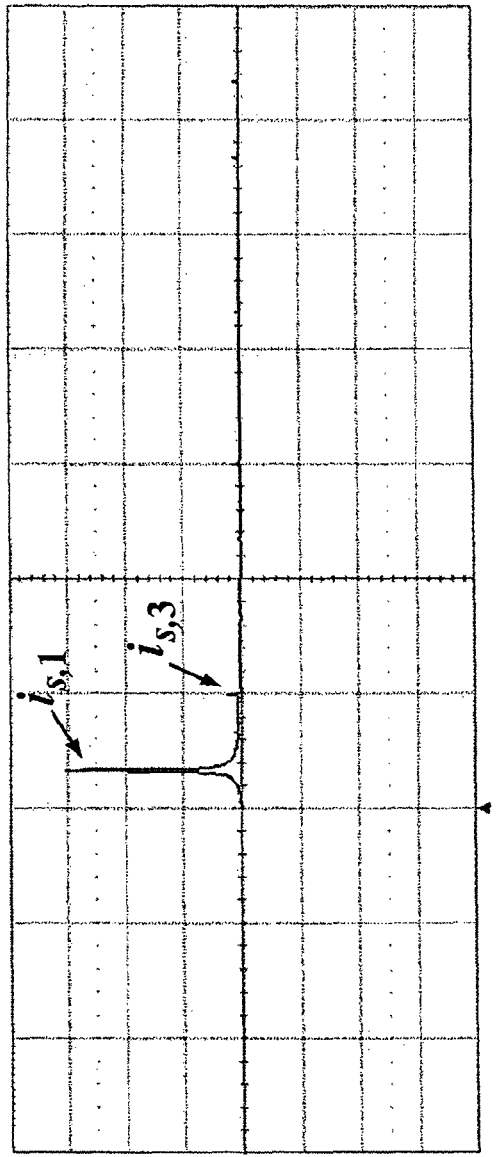
FIG. 8D shows the switch current and voltage.
Figure 8E:
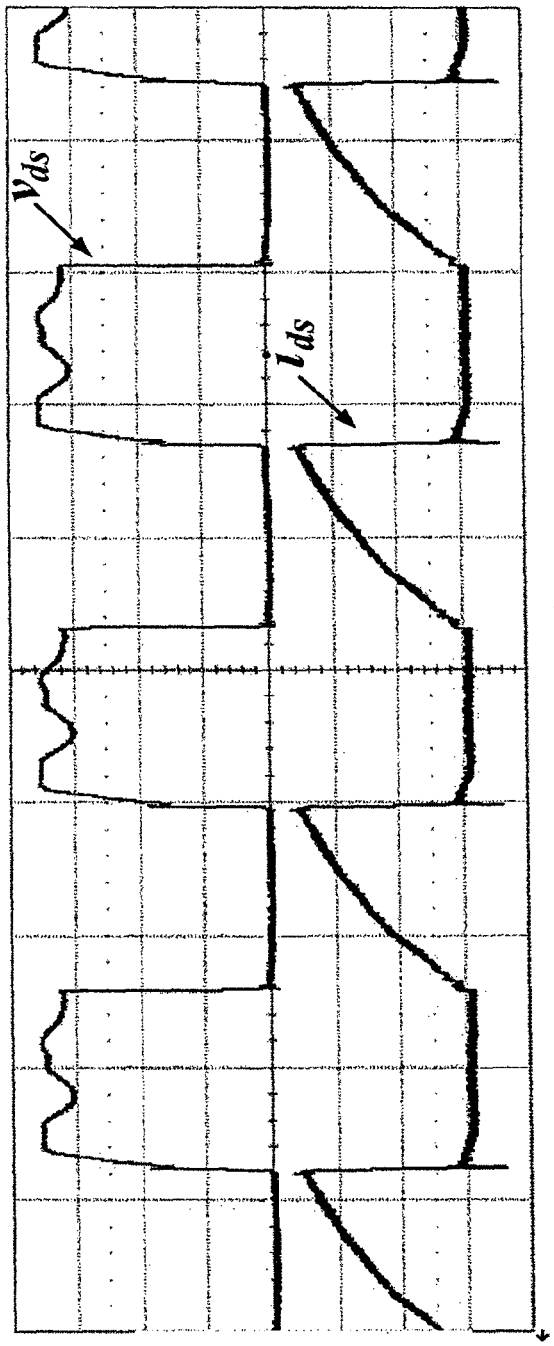
FIG. 8E shows the switch current voltage waveforms.

FIG. 7 is an electrical diagram of the experimental prototype. FIG. 8A-E shows the experimental waveforms of the circuit of FIG. 7. The lamp current and voltage are shown in FIG. 8A, where a crest factor of 1.48 was measured. The measured current waveforms $i_{out}$ and $i_L$ are shown in FIG. 8B. The measured line current is shown in FIG. 8C. A power factor of 0.995 and a THD of less than 10% were achieved according to the harmonic spectrum of $i_s$ shown in FIG. 8D. FIG. 8E shows the switch current ($i_{ds}$) and switch voltage ($v_{ds}$) waveforms. The peak current flowing through the switch was about 1.98 A. All the measured waveforms have good agreement with the theoretical waveforms and simulation results. The overall efficiency was measured to be 91.8% at 110 $V_{rms}$.

2. Electronic Ballast Circuit with Dimmer Controller (i) An electronic ballast circuit with dimmer controller based on the embodiment shown in FIG. 9B was built (see FIG. 10) and tested. A Sylvania Dulux® T/E 4-pin 26 W CFL with $I_{out}$=0.32 $A_{rms}$ was chosen as the testing load for the prototype circuit with a line voltage of 110 $V_{rms}$ 60 Hz. The switching frequency was 70 kHz and the quality factor was 2. FIG. 11A shows the line current under full lamp power, where a power factor of 0.96 was achieved. FIG. 11B shows the line current with a firing angle of 35° applied to the triac dimmer, where the power factor was 0.86. At this level of firing angle, the lamp current was substantially reduced to less than 0.1 A at a dimming level of 10% of the lamp rated power.

(ii) An electronic ballast circuit with dimmer controller based on the embodiments shown in FIGS. 2A and 12A was built and tested.

Figure 13A:
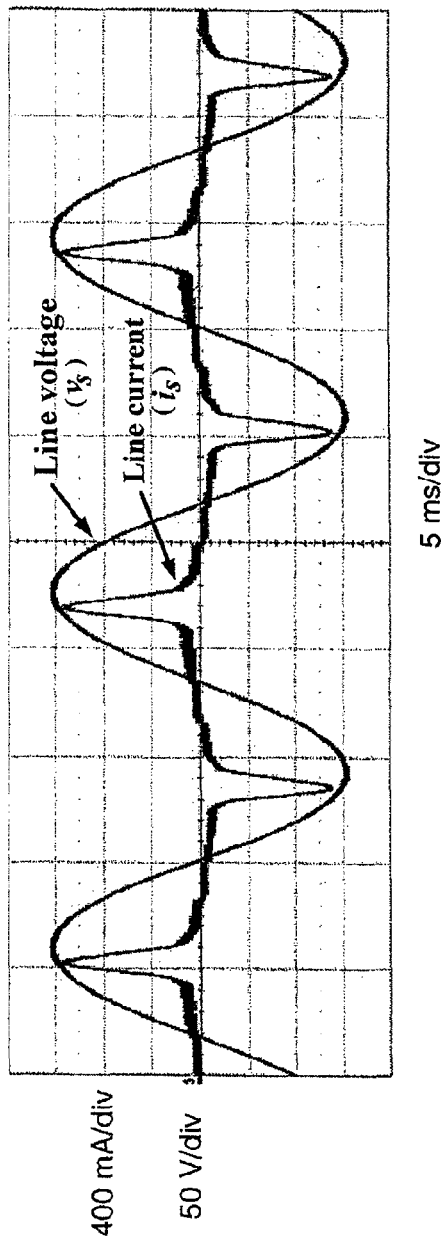
FIGS. 13A and 13B show the line voltage and current for a commercially-available 15 W dimmable CFL at full power and at the lowest dimming level, respectively.
Figure 13B:
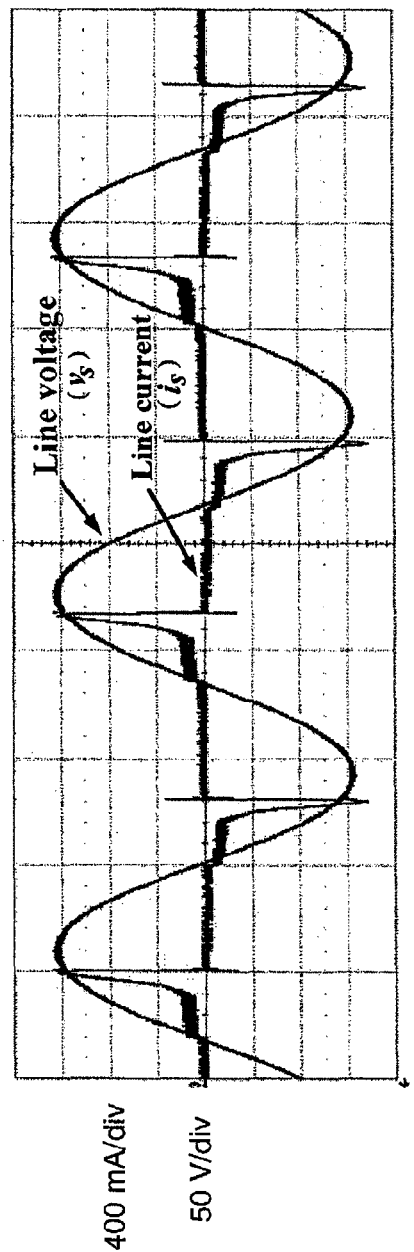

Performance was verified through use of the combination electronic ballast circuit with dimmer controller with a four pin 13 W CFL. A 15 W General Electric (GE) dimmable CFL (FLE15HT3/2/SW) was used as a reference product for performance comparison. The dimmers used in the experimental setup were standard phase-cut leading edge (triac) and trailing edge (transistor) dimmers, both from Leviton Mfg. of Canada Ltd. FIG. 13A shows the line current of the 15 W GE lamp under full power, where the power factor was 0.85. FIG. 13B shows the line current of the 15 W GE lamp with the smallest firing angle (i.e., fully dimmed) using the standard incandescent dimmer. The power factor at this power level was 0.62. The high peak current waveform results in a poor power factor as the conduction angle of the line current decreases during dimming. For this reason, the dimming range is very limited in the commercial dimmable CFL. Further, when the line voltage drops, this lamp is unable to sustain the arc across the lamp and the light will turn off in this situation.

Figure 14A:
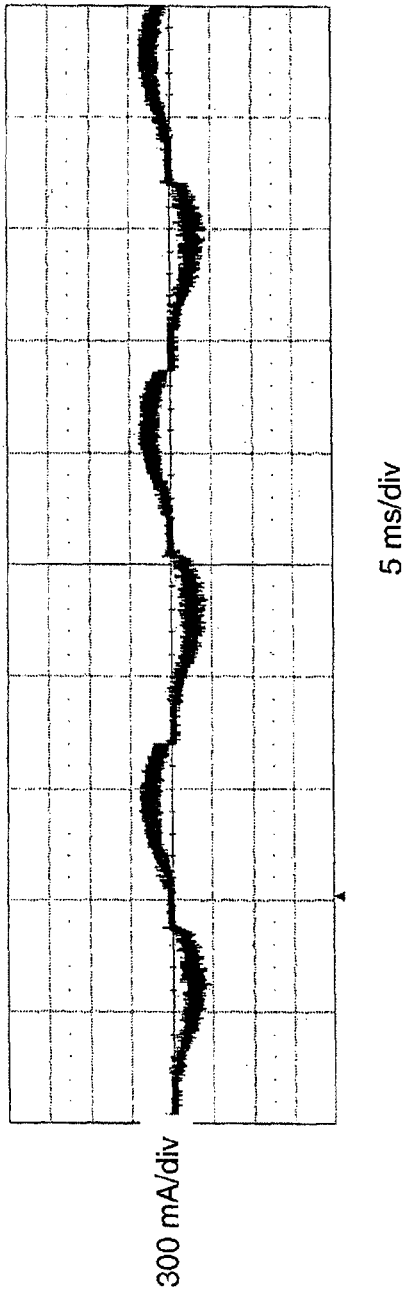
FIGS. 14A and 14B show the line current for a 13 W CFL at full power and at the lowest dimming level, respectively, using the embodiment of FIG. 12B and a trailing edge dimmer.
Figure 14B:
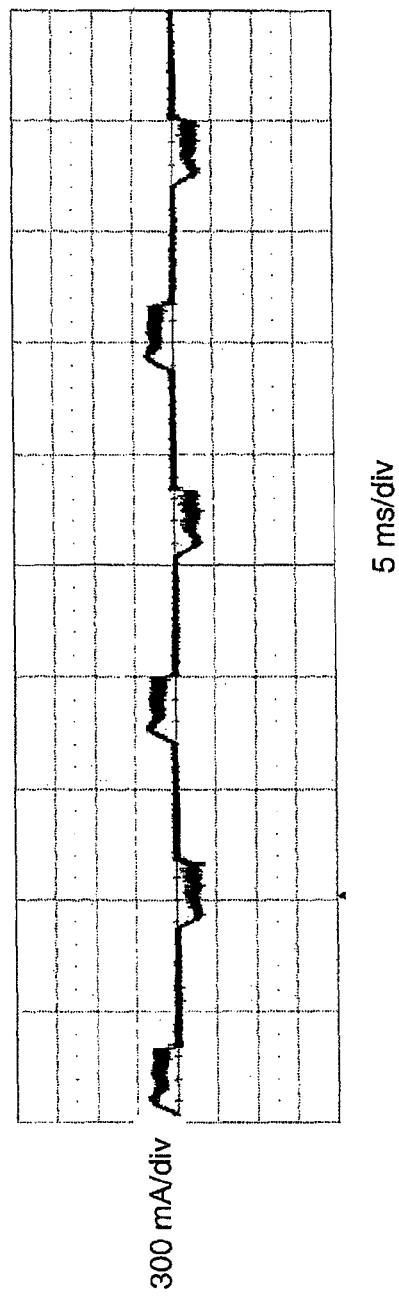
Figure 14C:
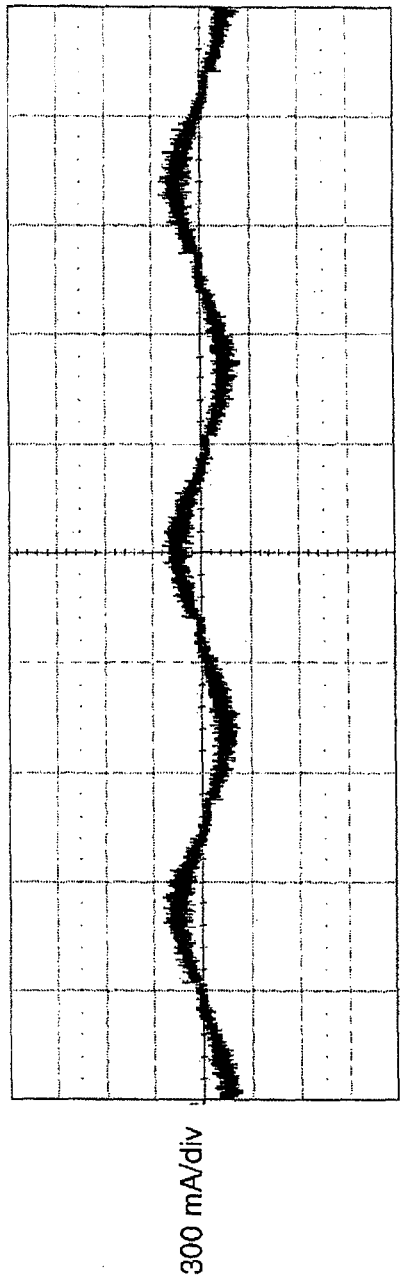
FIGS. 14C and 14D show the line current for a 13 W CFL at full power and at a partial dimming level, respectively, using the embodiment of FIG. 12B and a leading edge dimmer.
Figure 14D:
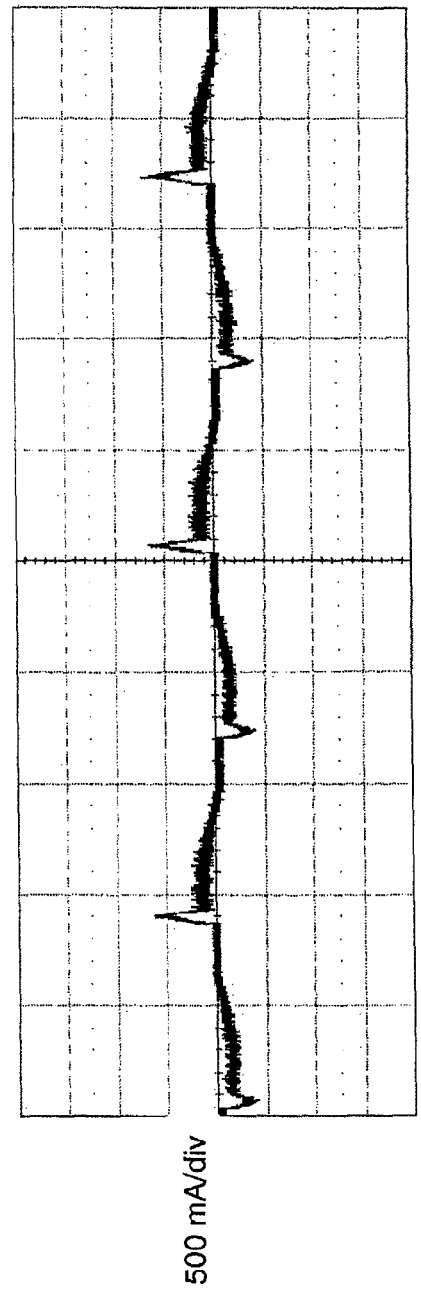

Results for the electronic ballast circuit with dimmer controller are shown in FIGS. 14A-D. FIG. 14A shows the line current at full lamp power for the trailing edge dimmer, where the power factor was 0.97. FIG. 14B shows the line current at the lowest dimming level for the trailing edge dimmer, where the power factor was 0.84. When fully dimmed, no lamp flickering was observed and glow-discharge mode operation was avoided. FIG. 14C shows the line current at full lamp power for the leading edge dimmer, where the power factor was 0.98. FIG. 14D shows the line current at a partial dimming level for the leading edge dimmer, where the power factor was 0.86.

Figure 15:
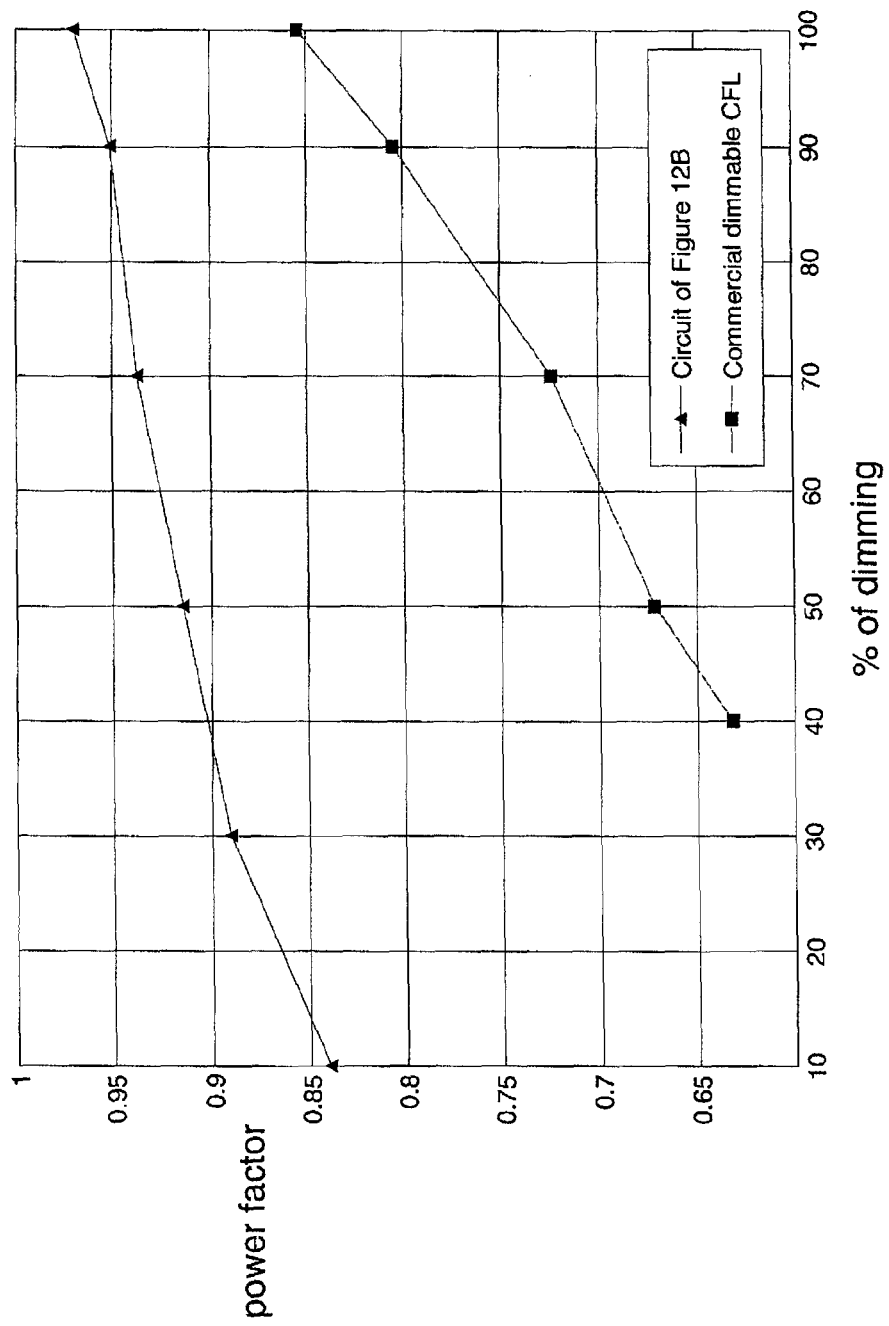
FIG. 15 is a plot comparing the power factor of a commercially-available dimmable 15 W CFL and a 13 W CFL used with the embodiment of FIG. 12B, over the dimming range.
Figure 16:
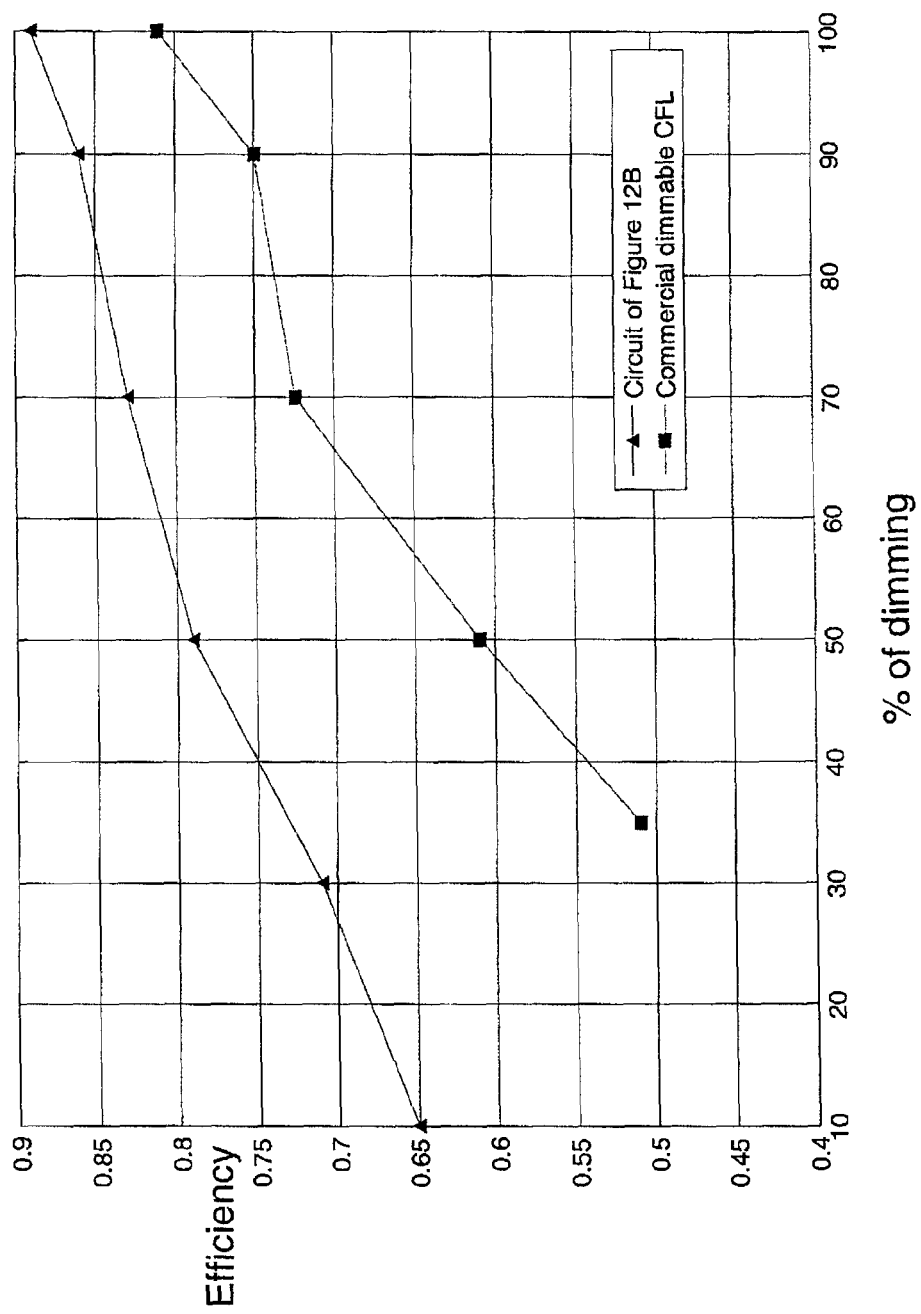
FIG. 16 is a plot comparing the efficiency of a commercially-available dimmable 15 W CFL and a 13 W CFL used with the embodiment of FIG. 12B, over the dimming range.

FIG. 15 summarizes and compares the power factor achieved from the electronic ballast circuit with dimmer controller, using the trailing edge dimmer and the 13 W CFL, and the GE 15 W dimmable CFL. It is observed that there is a significant improvement of more than 20% in power factor of the embodiment of FIG. 12, relative to the commercially-available dimmable CFL. The dimming range of the CFL is also much wider with the embodiment of FIG. 12, relative to the commercially-available dimmable CFL. The efficiency plot shown in FIG. 16 shows that an efficiency of close to 0.9 was achieved at the rated power in the embodiment of FIG. 12, relative to about 0.81 in the commercially-available dimmable CFL.

Figure 20A:
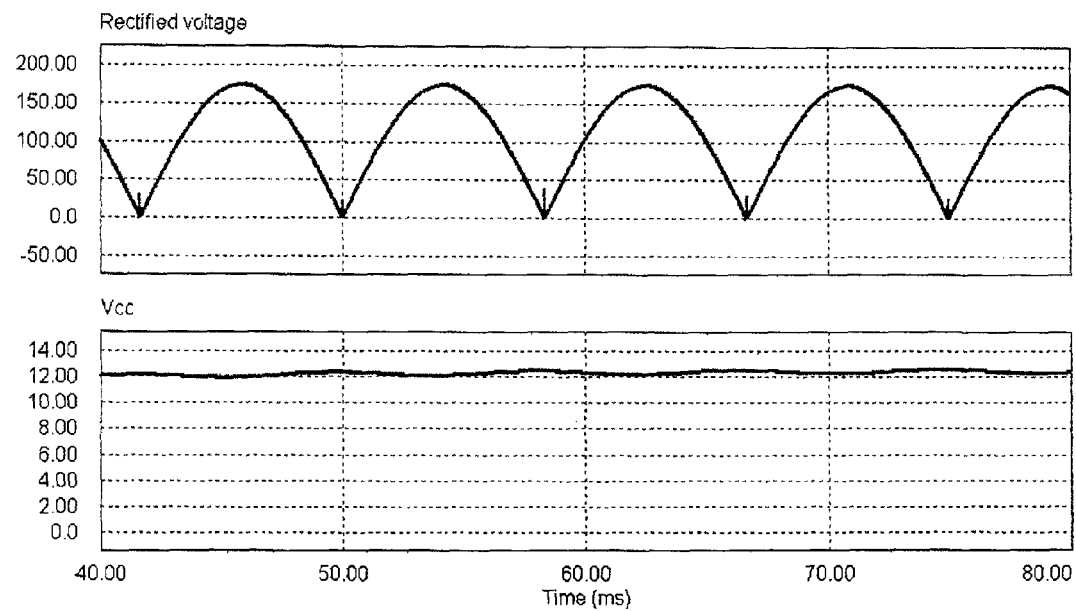
FIGS. 20A and 20B are results of a simulation of a circuit based on FIGS. 18 and 19A.
Figure 20B:
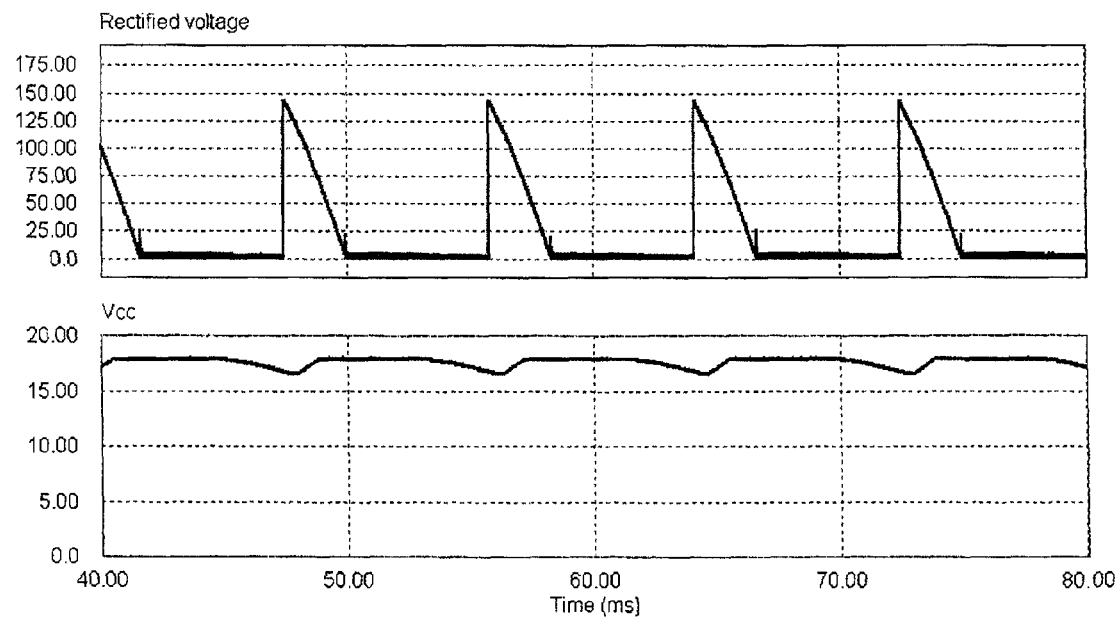

3. Electronic Ballast Circuit with Integrated Controller Power Supply and Dimmer Controller Performance of an electronic ballast circuit and controller based on the embodiments of FIGS. 18 and 19A was verified through simulation. FIG. 20A shows the simulation results with the rectified voltage and $V_{cc}$ at full lamp power. FIG. 20B shows the rectified voltage and $V_{cc}$ at a low dimming level where a firing angle of 130 degrees was applied by the dimmer. It is observed that $V_{cc}$ remains well above 5 V in both cases; where 5 V is the typical voltage value required to properly switch on the power MOSFET $M_1$. This implies that the power MOSFET may be continuously switched on and off regardless of the firing angle applied by the dimmer.

Figure 21:
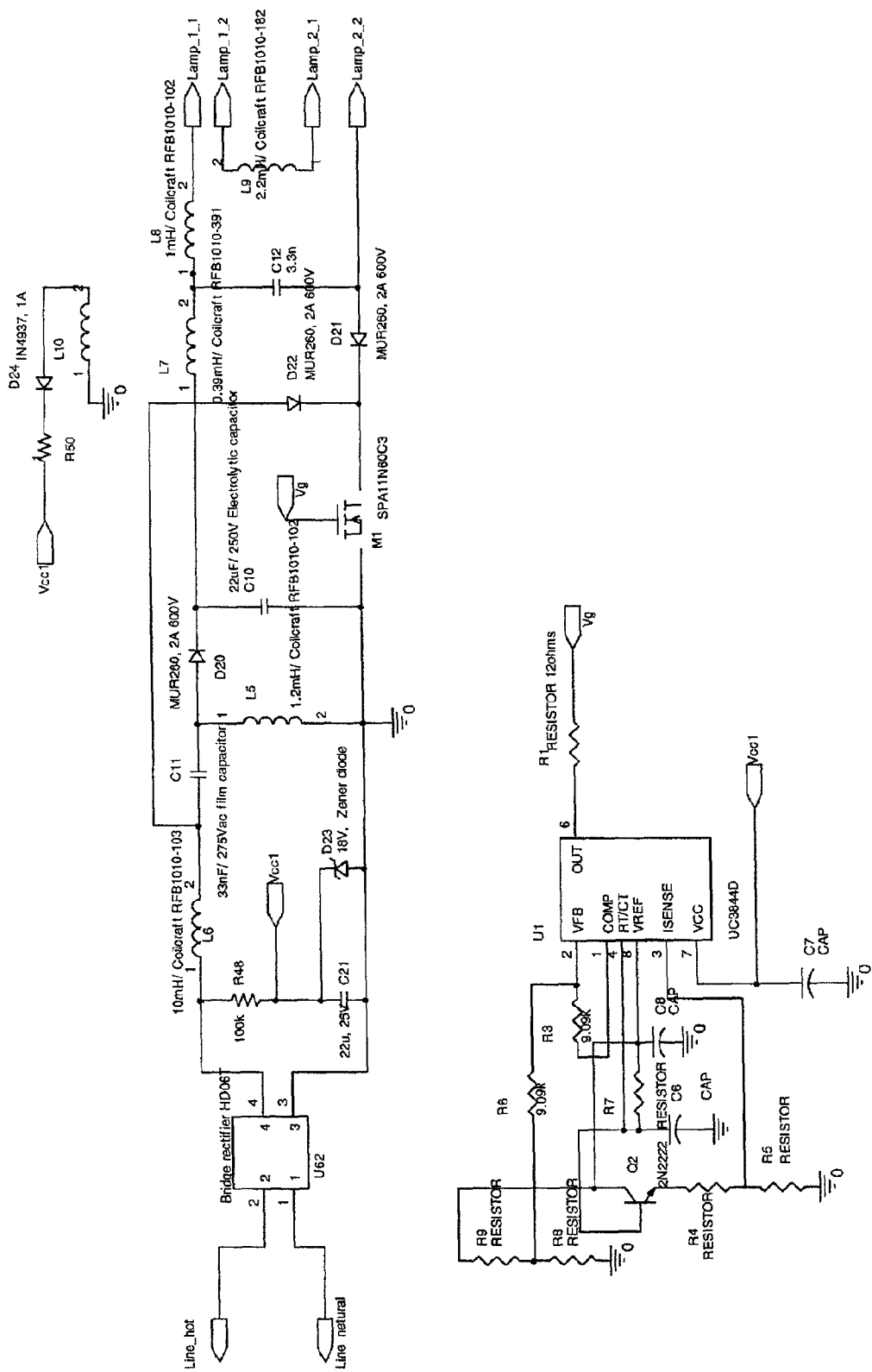
FIG. 21 is a schematic diagram of a prototype circuit based on FIGS. 18 and 19A.
Figure 22A:
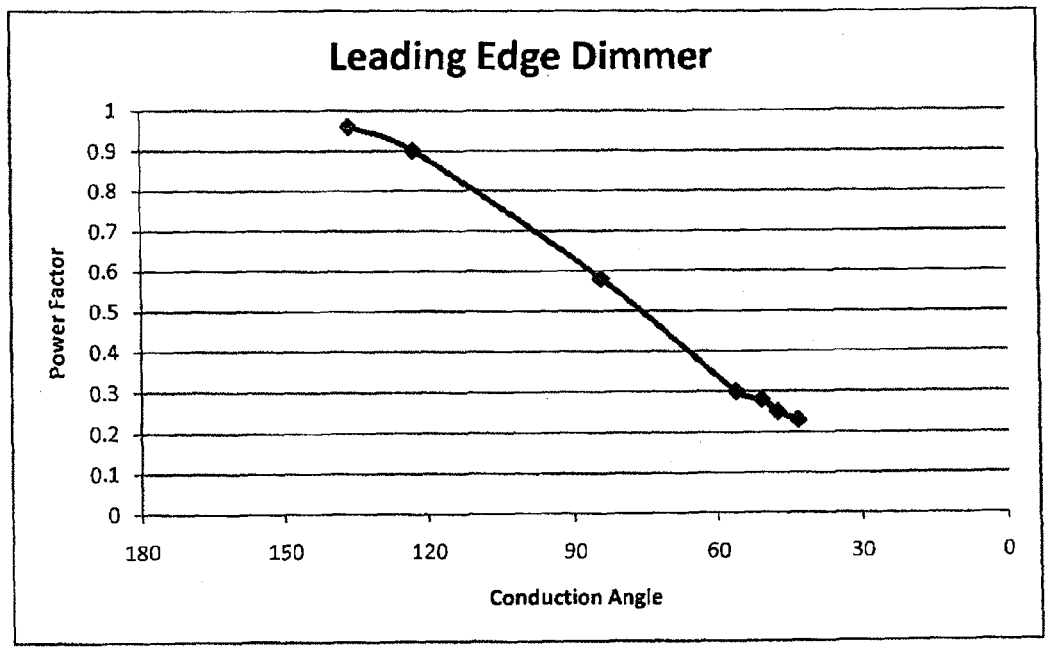
FIGS. 22A and 22B show power factor and efficiency of the circuit of FIG. 21 using a leading edge dimmer.
Figure 22B:
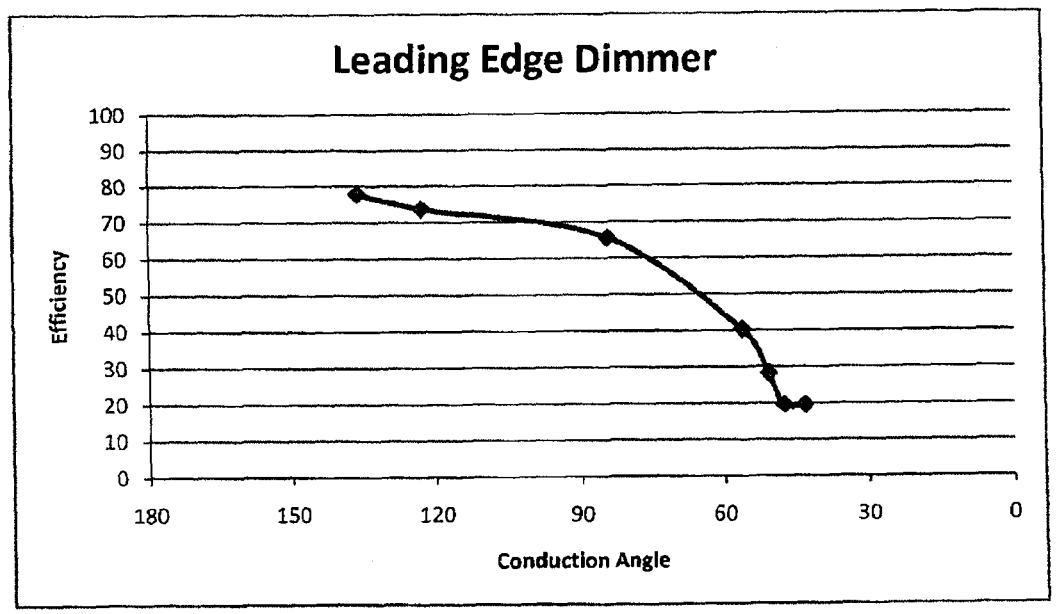
Figure 23A:
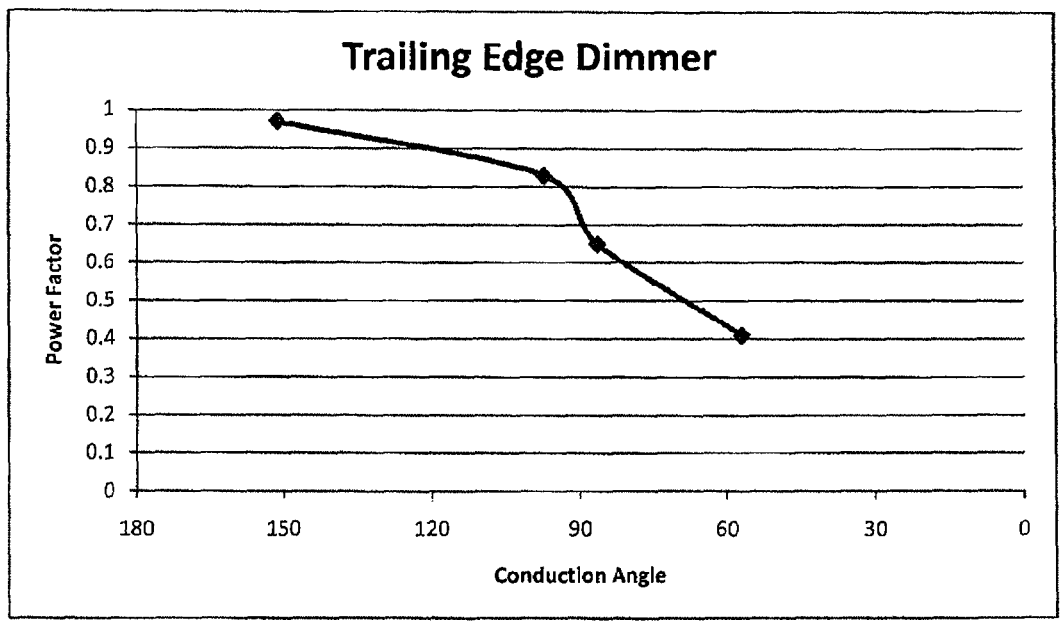
FIGS. 23A and 23B show power factor and efficiency of the circuit of FIG. 21 using a trailing edge dimmer.
Figure 23B:
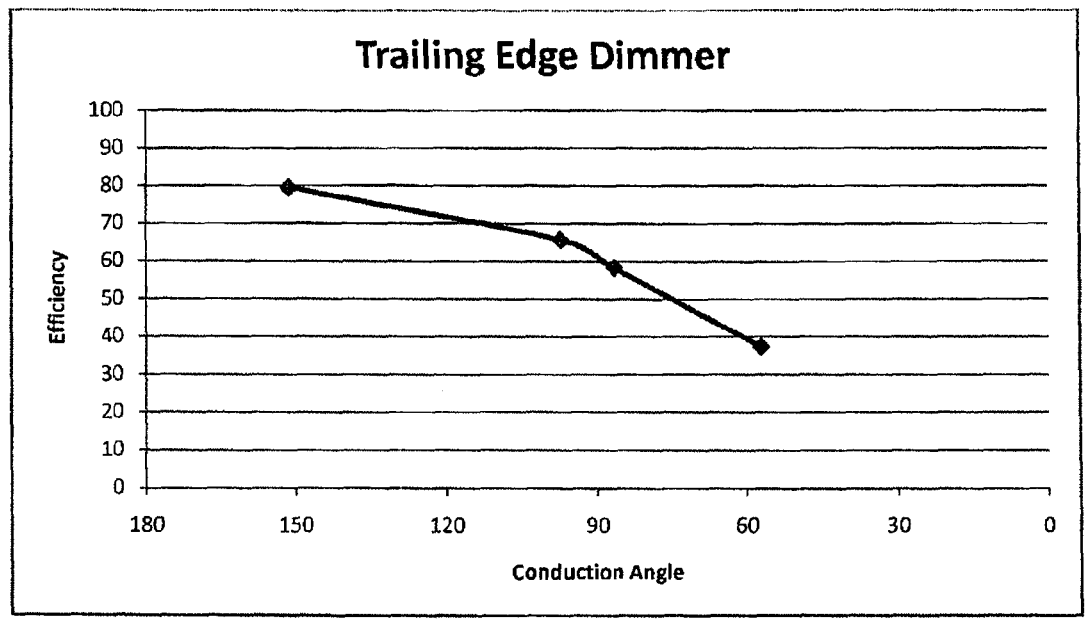

In addition, a prototype circuit based on the embodiments of FIGS. 18 and 19A was built and tested. The schematic diagram of the prototype circuit is shown in FIG. 21. The power factor and efficiency using a leading edge dimmer are shown in FIGS. 22A and 22B. The power factor and efficiency using a trailing edge dimmer are shown in FIGS. 23A and 23B.

Equivalents

Those skilled in the art will recognize, or be able to ascertain, equivalents to the embodiments described herein. Such equivalents are considered to be encompassed by the invention and are covered by the appended claims.

References

[1] National Resources Canada, "Commercial and Institutional Retrofits—Technical Information—Fluorescent Lamp And Ballast Options" 2002.

[2] International standard IEC 1000-3-2 Class C. led, March 1995.

[3] T.-F. Wu and T.-H. Yu.; "A unified approach to developing single stage power converters", *IEEE Trans. on Aerospace and Electronic Systems*, vol. 34, no. 1, 1998, pp. 211-223.

[4] A. J. Calleja, J. M. Alonso, J. Ribas, E. Lopez, J. Cardesin, J. Garcia and M. Rico-Secades, "Electronic ballast based on single-stage high-power-factor topologies: a comparative study", in *Proceedings of the* 2002 *IEEE Industrial Electronics Society Conf.*, pp.1196-1201.

[5] Alonso, J. M., Calleja, A. J.; Ribas, J., Corominas, E. L., Rico-Secades, M., "Analysis and design of a novel single-stage high-power-factor electronic ballast based on integrated buck half-bridge resonant inverter", *IEEE Trans. on Power Electronics*, vol. 19, no. 2, March 2004, pp. 550-559.

[6] Chiu, H.-J., Lin, L.-W., Wang, C.-M., "Single-stage dimmable electronic ballast with high power factor and low EMI", in *Proceedings of the* 2005 *Electric Power Applications Conference*, pp. 89-95.

[7] DeMorais, A. S., Farias, V. J.; deFreitas. L. C., Coelho, E. A. A., Vieira, J. B., Jr., "A high power factor ballast using a single switch with both power stages integrated", *IEEE Trans. on Power Electronics*, vol. 21, no. 2, March 2006, pp. 524-531.

[8] Weihong Qiu; Moussaoui, Z.; Wenkai Wu; Batarseh, I., "Single-switch zero-voltage-switching high power factor electronic ballast", in *Proceedings of the IEEE 2002 Power Electronics Specialists Conference*, pp. 773-778.

[9] Ponce, R. Vazquez and J. Arau, "High power factor electronic ballast for compact fluorescent lamps based in a class E amplifier with LCC resonant tank", in *Proceedings of the 1999 IEEE Applied Power Electronics Conference*, pp. 486-492.

[10] Cheng, H. L.; Moo, C. S.; Yen, H. C.; Lin, T. F.; Huang, S. H.; "Single-switch high-power-factor electronic ballast for compact fluorescent lamps", in *Proceedings of the 2001 IEEE International Conference on Power Electronics and Drive Systems*, pp. 764-769.

[11] Liu, K.-H.; Lin, Y.-L.; "Current waveform distortion in power factor correction circuits employing discontinuous-mode boost converters", in *Proceedings of the 1989 IEEE Power Electronics Specialists Conference*, pp. 825-829.

[12] Simonetti, D. S. L.; Sebastian, J.; Uceda, J.; "The discontinuous conduction mode Sepic and Cuk power factor preregulators: analysis and design", *IEEE Trans on Industrial Electronics*, vol. 44, no. 5, Oct. 1997, pp. 630-637.

[13] Lam, J.; Jain, P.; "A low cost single-stage electronic ballast with unity power factor using a novel single switch current fed resonant inverter topology", in *Proceedings of the 2007 IEEE Power Electronics Specialists Conference*, 17-21 Jun. 2007, pp. 3106-3111.

The invention claimed is:

1. An electronic ballast circuit for a fluorescent lamp, comprising:
    a power circuit that outputs power to the lamp; the power circuit having:
        a rectifier for converting an alternating current input voltage into a direct current output voltage, and
        a circuit including a combined power factor correction (PFC) stage and an inverter; and
    an integrated power supply for a controller circuit; the integrated power supply providing start-up power to the controller circuit; and also providing steady state power to the controller circuit when the lamp is at full power and when the lamp is dimmed; and
    wherein a steady state power circuit of the integrated power supply provides the steady state power to the controller circuit; the steady state power circuit including an auxiliary winding associated with an inductor of the inverter;
    wherein the power circuit operates with only one switch; and
    wherein the integrated power supply receives a portion of output power from the power circuit and delivers the portion of the output power to the controller circuit.

2. The electronic ballast circuit of claim 1, wherein the PFC stage includes a single ended primary inductor converter (SEPIC).

3. The electronic ballast circuit of claim 1, comprising a start-up circuit of the integrated power supply for providing the start-up power, the start-up circuit including a series resistor and capacitor connected across the rectifier.

4. The electronic ballast circuit of claim 1, wherein the inverter is selected from any one of a resonant inverter and a current fed inverter.

5. The electronic ballast circuit of claim 1, wherein the inverter is a current fed inverter including a C-L-L resonant circuit.

6. The electronic ballast circuit of claim 1, wherein the fluorescent lamp is a compact fluorescent lamp (CFL).

7. The electronic ballast circuit of claim 1, wherein the PFC stage and the inverter share the one switch.

8. A method of providing power to a fluorescent lamp, comprising:
    rectifying an alternating current input voltage to produce a direct current voltage;
    providing the direct current voltage to a power circuit that operates using only one switch to produce output power for the lamp;
    combining a power factor correction (PFC) stage and an inverter for the power circuit;
    sharing the one switch between the PFC stage and the inverter;
    using a portion of the output power to provide power to a controller for the power circuit;
    associating an auxiliary winding with an inductor of the inverter, wherein a steady state power circuit of an integrated power supply for the controller provides the steady state power to the controller, wherein the steady state power circuit includes the auxiliary winding associated with the inductor of the inventor; and
    providing start-up power to the controller, and providing the steady state power to the controller when the lamp is at full power and when the lamp is dimmed.

9. The method of claim 8, including operating the shared switch at a selected duty ratio.

10. The method of claim 8, including operating the shared switch with a variable duty ratio.

11. The method of claim 8, further comprising:
    using a dimmer to adjust the alternating current input voltage;
    wherein adjusting the alternating current input voltage adjusts brightness of the fluorescent lamp.

12. The method of claim 11, wherein the dimmer is a leading edge dimmer.

13. The method of claim 11, wherein the dimmer is a trailing edge dimmer.

14. The method of claim 8, wherein the fluorescent lamp is a compact fluorescent lamp (CFL).

* * * * *